Figure 8:
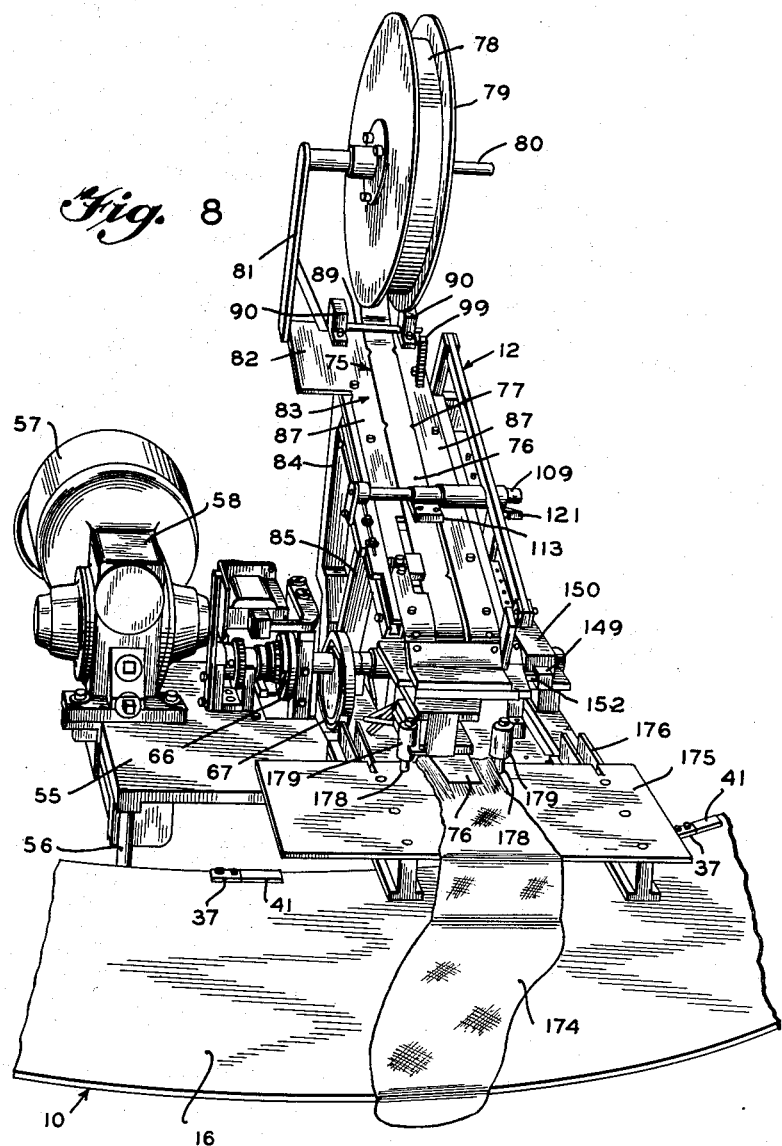

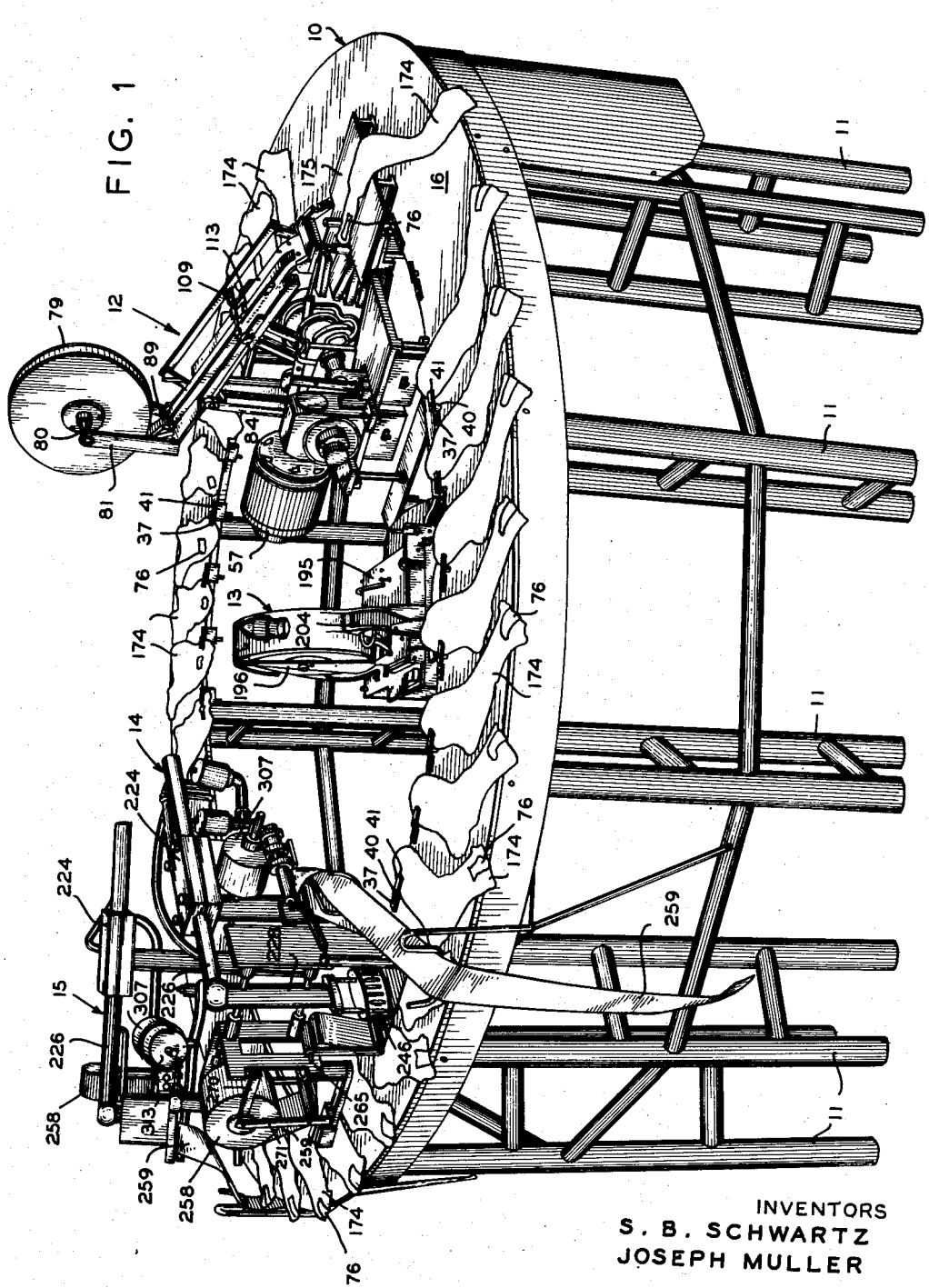

Sept. 28, 1954     S. B. SCHWARTZ ET AL     2,690,104
COMBINATION LABELING AND MARKING MACHINE
Filed Feb. 5, 1952
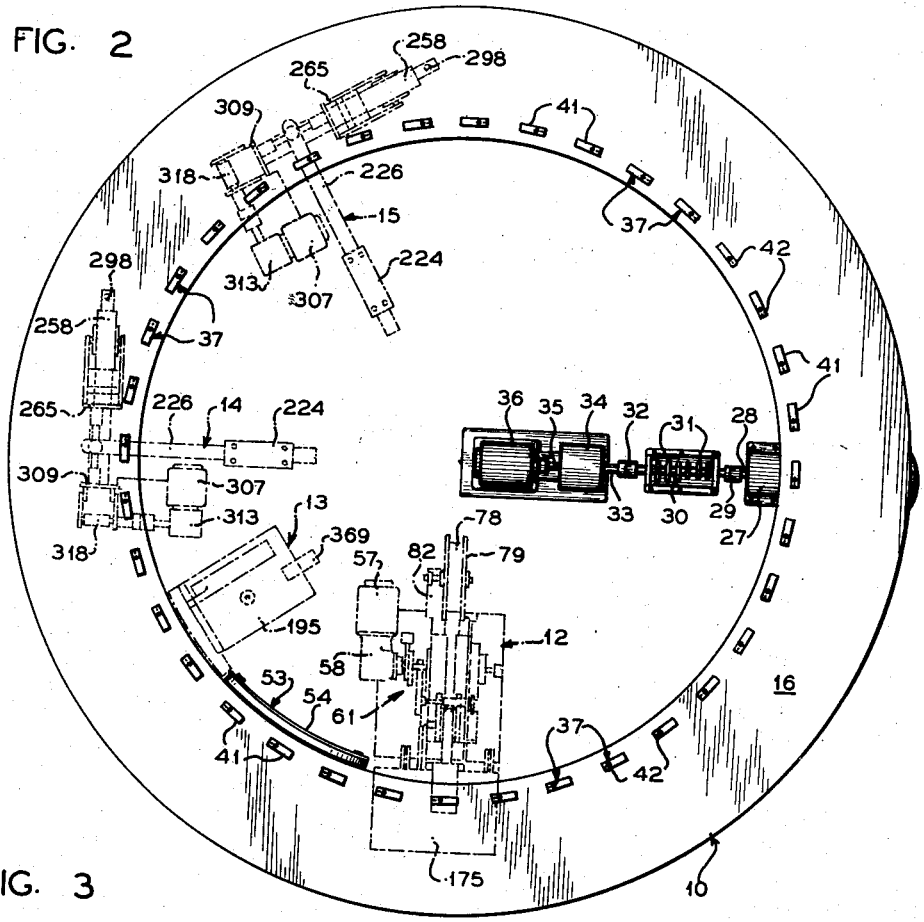
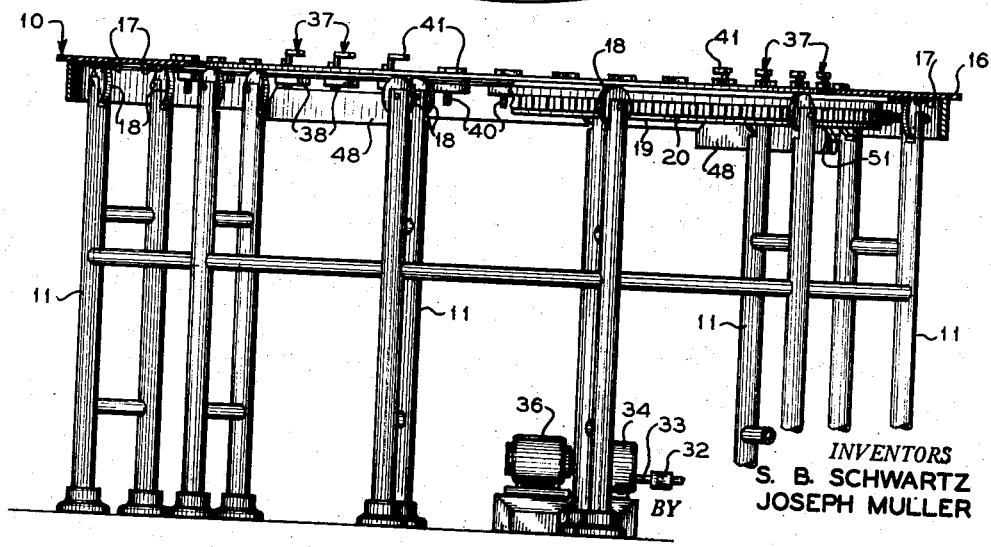
INVENTORS
S. B. SCHWARTZ
JOSEPH MULLER
BY
*A. Yates Dowell*
ATTORNEY Sept. 28, 1954     S. B. SCHWARTZ ET AL     2,690,104
COMBINATION LABELING AND MARKING MACHINE
Filed Feb. 5, 1952     17 Sheets-Sheet 3
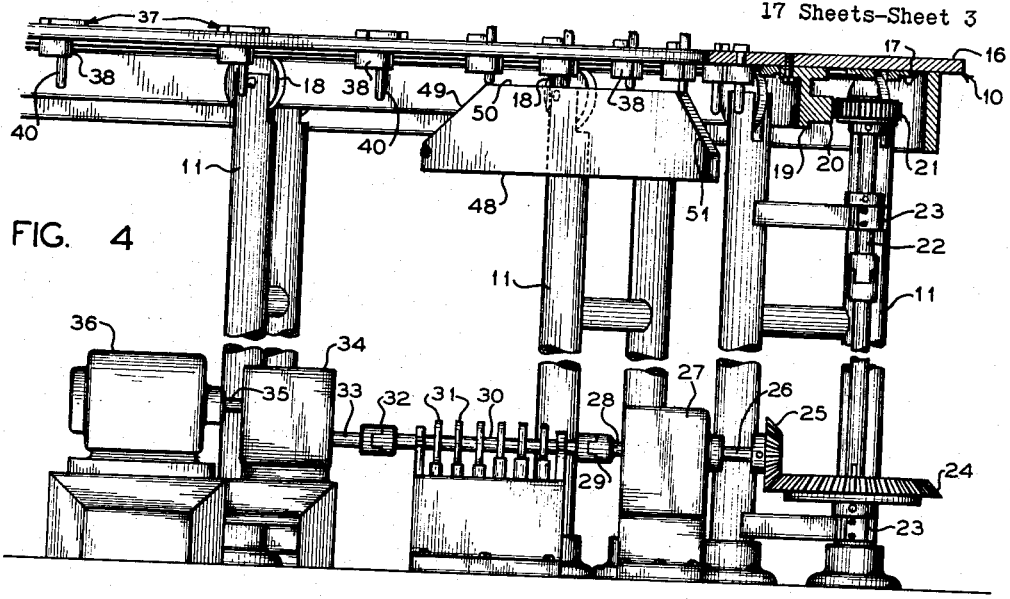
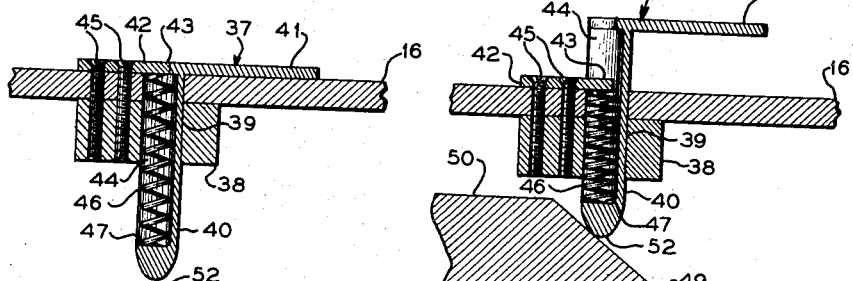
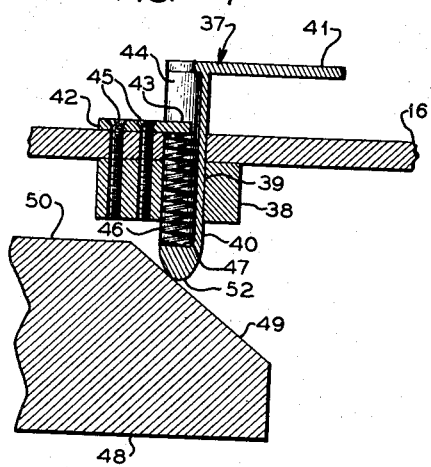
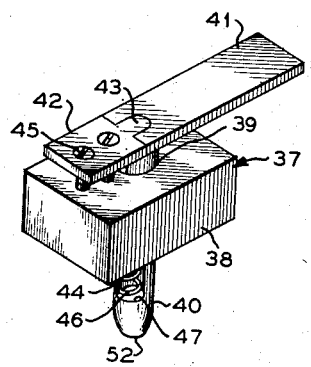
INVENTORS
S. B. SCHWARTZ
JOSEPH MULLER
BY
A. Yates Dowell
ATTORNEY Sept. 28, 1954  S. B. SCHWARTZ ET AL  2,690,104
COMBINATION LABELING AND MARKING MACHINE
Filed Feb. 5, 1952
17 Sheets-Sheet 4

INVENTORS.
S. B. SCHWARTZ
JOSEPH MULLER
BY A. Yates Dowell
attorney

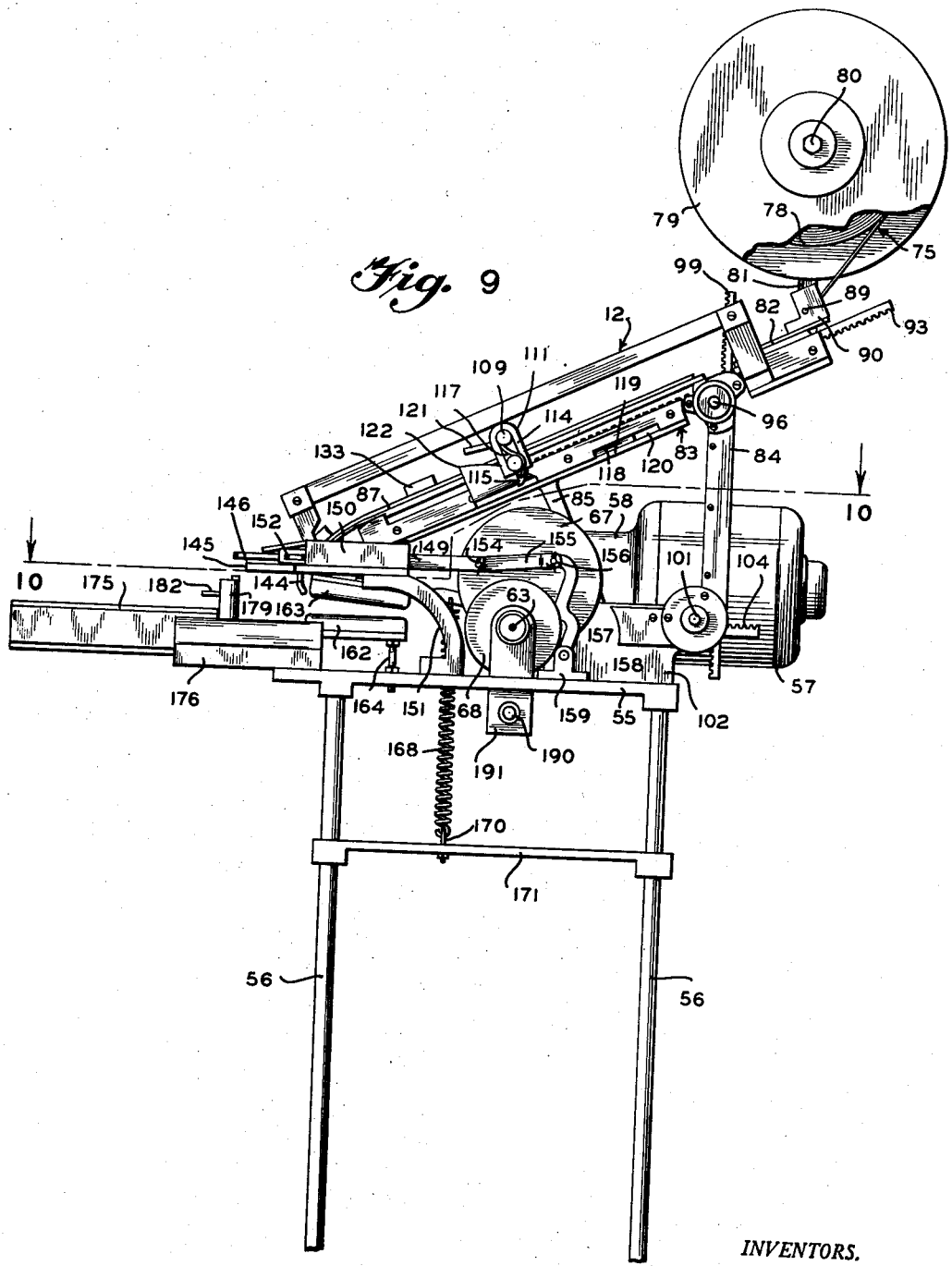

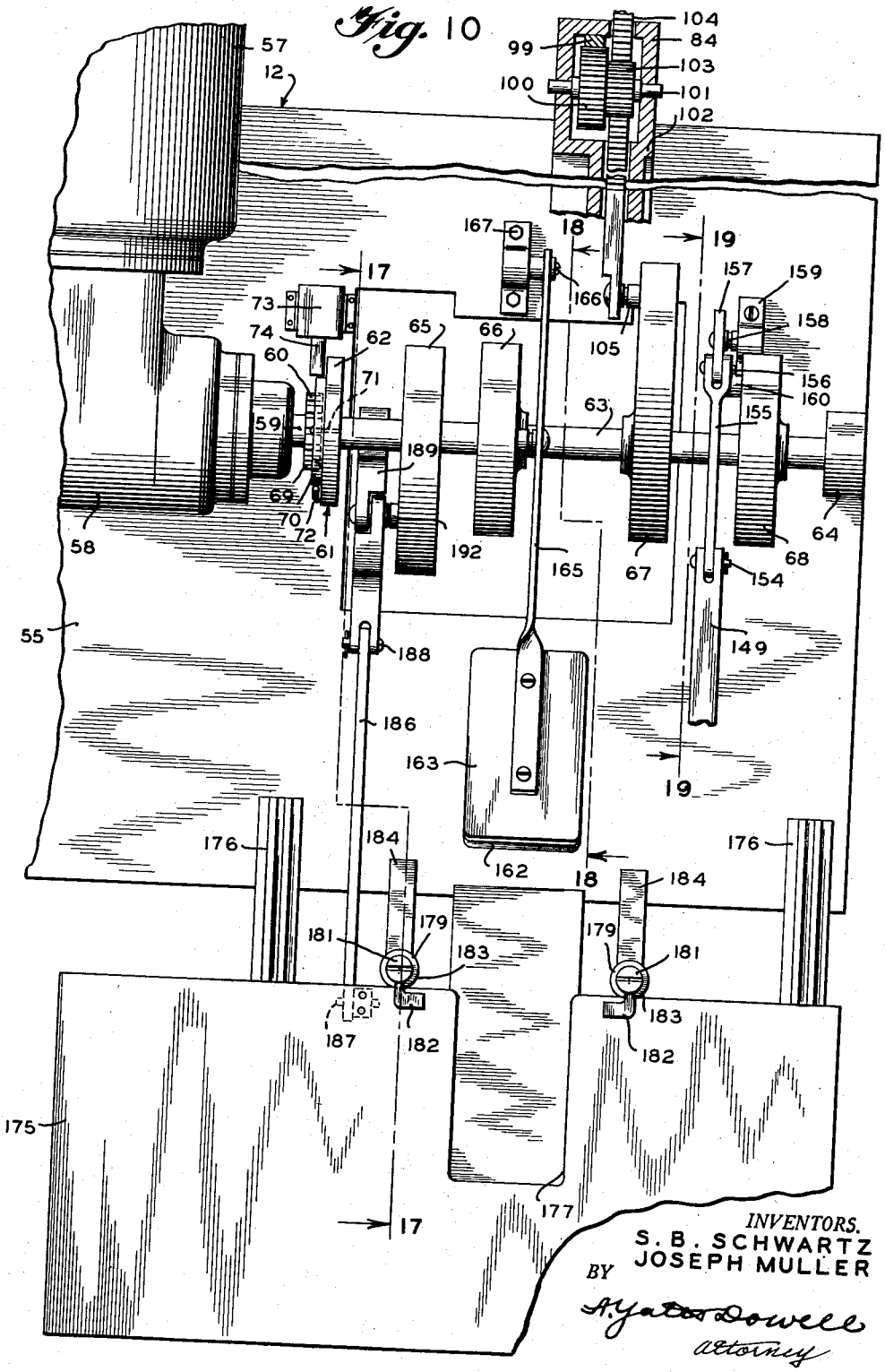

Sept. 28, 1954   S. B. SCHWARTZ ET AL   2,690,104
COMBINATION LABELING AND MARKING MACHINE
Filed Feb. 5, 1952
17 Sheets-Sheet 7
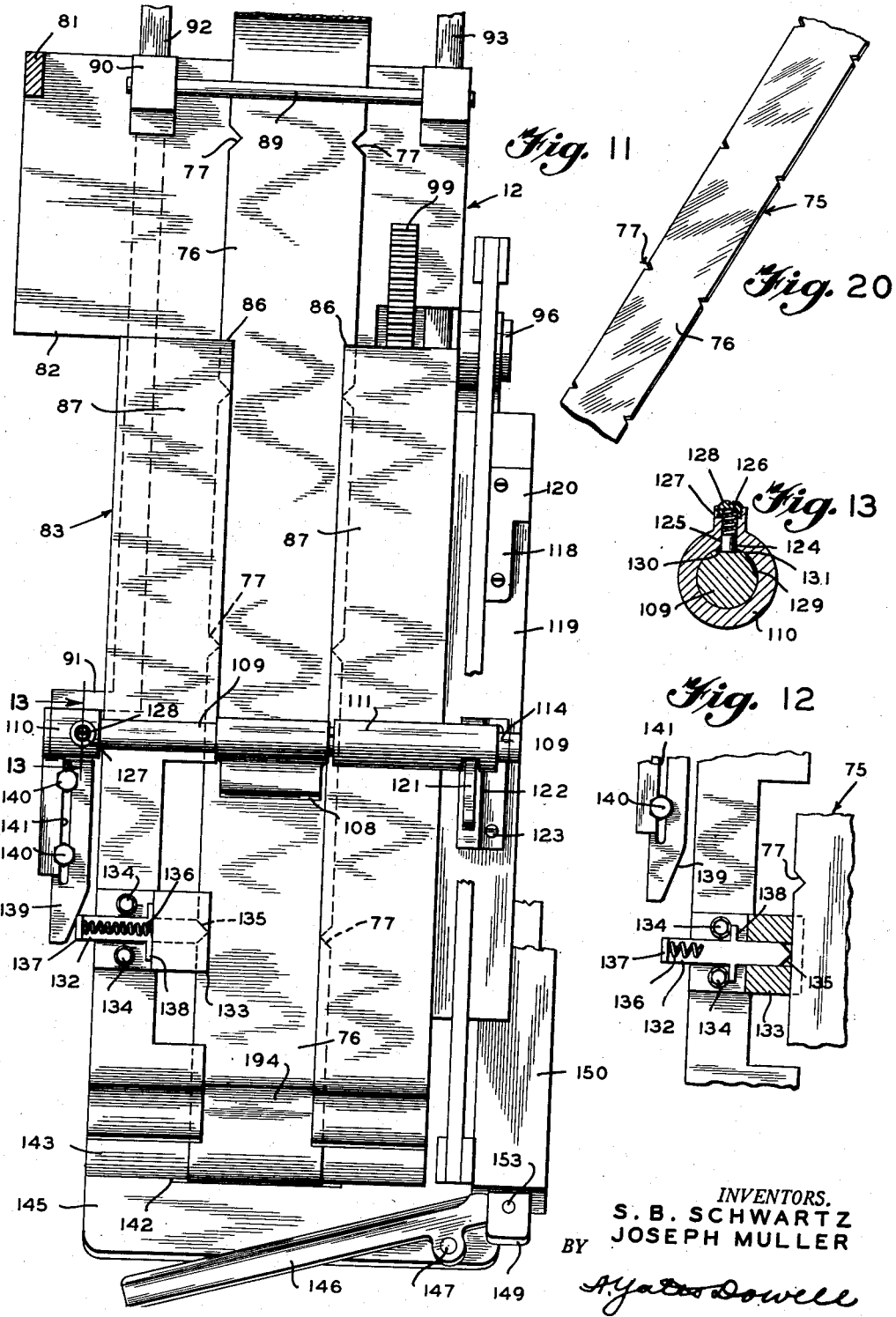
INVENTORS.
S. B. SCHWARTZ
JOSEPH MULLER
BY A. Yates Dowell
ATTORNEY

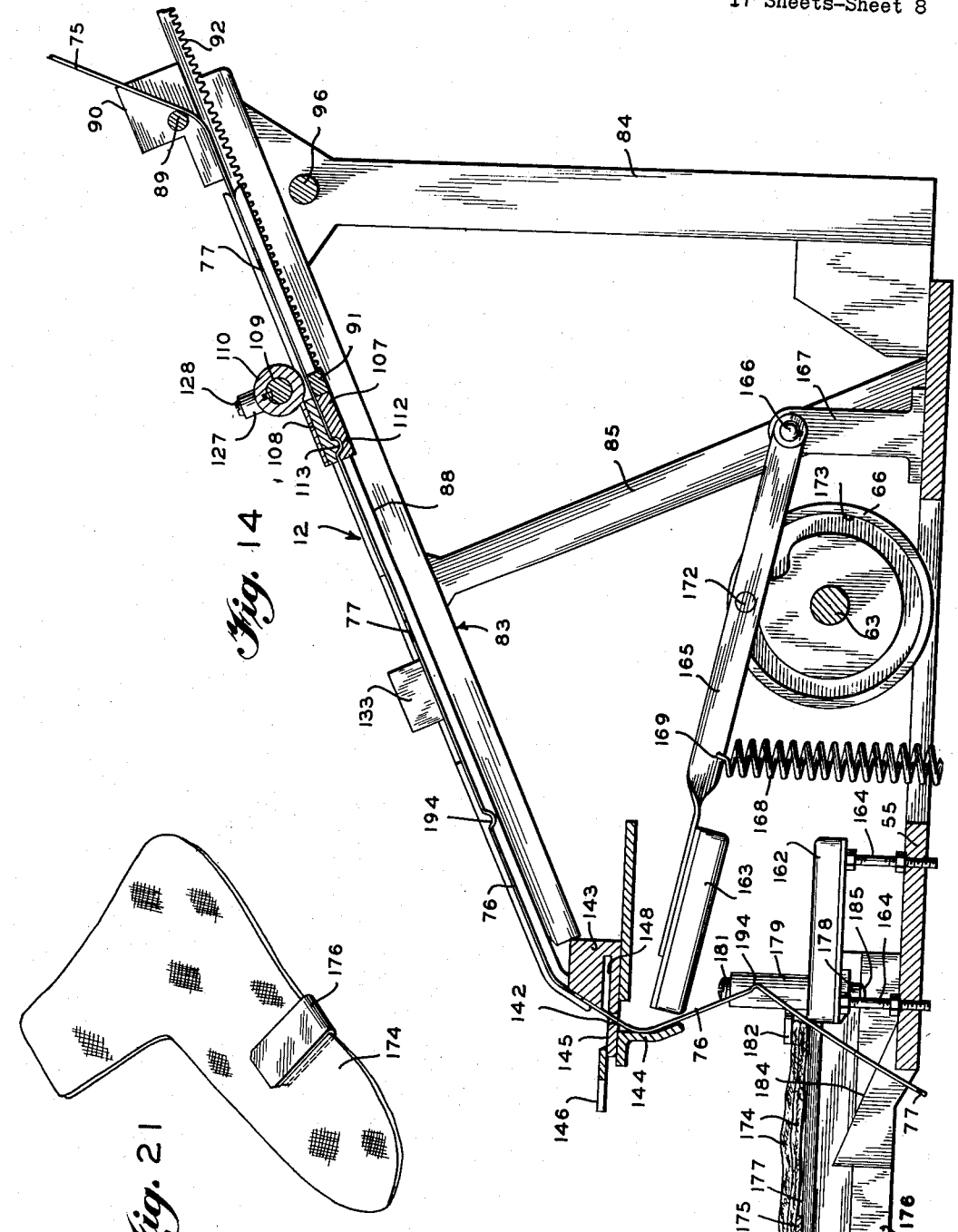

Sept. 28, 1954  S. B. SCHWARTZ ET AL  2,690,104
COMBINATION LABELING AND MARKING MACHINE
Filed Feb. 5, 1952  17 Sheets-Sheet 9
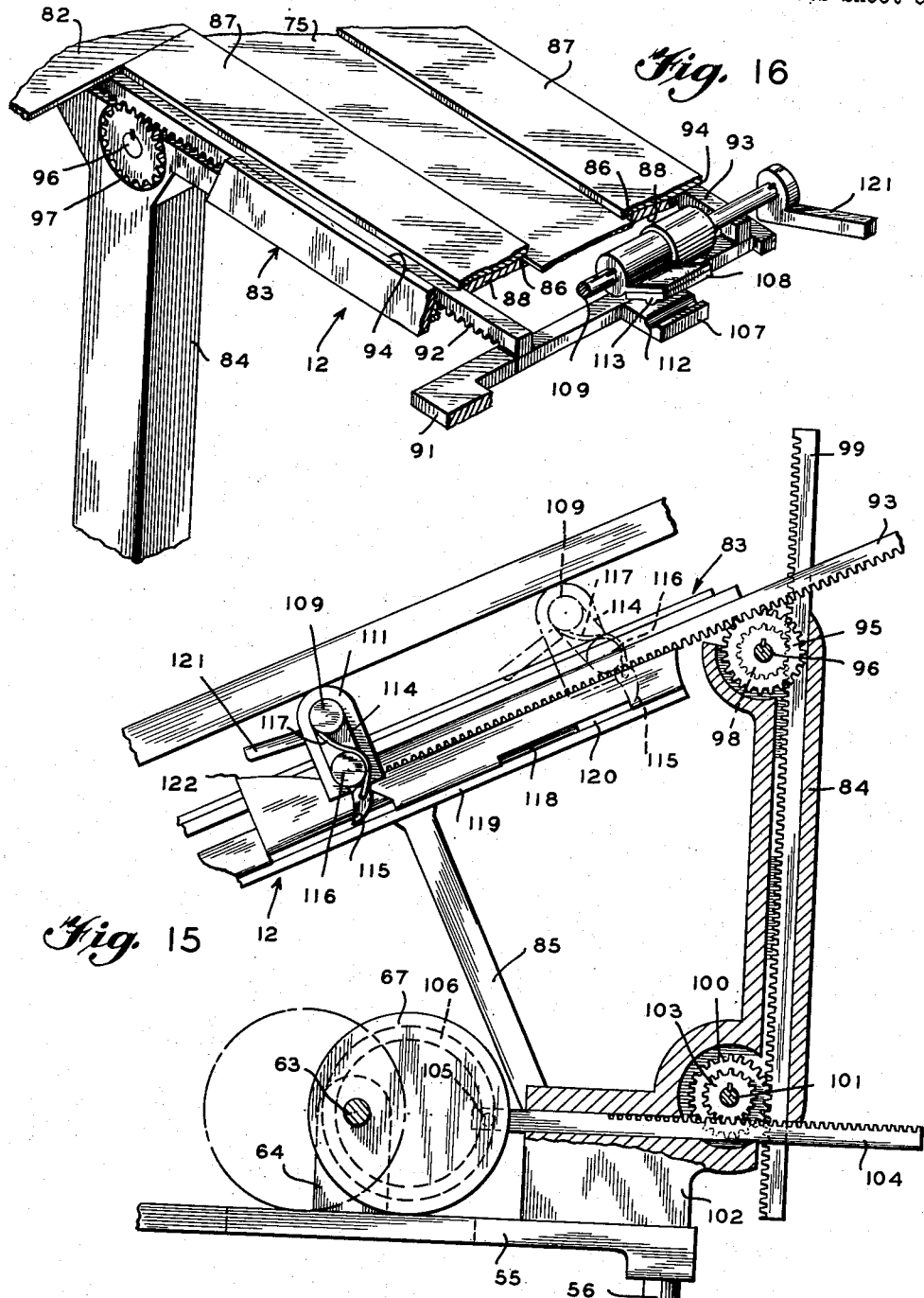
INVENTOR.
S. B. SCHWARTZ
JOSEPH MULLER
BY
attorney Sept. 28, 1954     S. B. SCHWARTZ ET AL     2,690,104
COMBINATION LABELING AND MARKING MACHINE
Filed Feb. 5, 1952     17 Sheets-Sheet 10
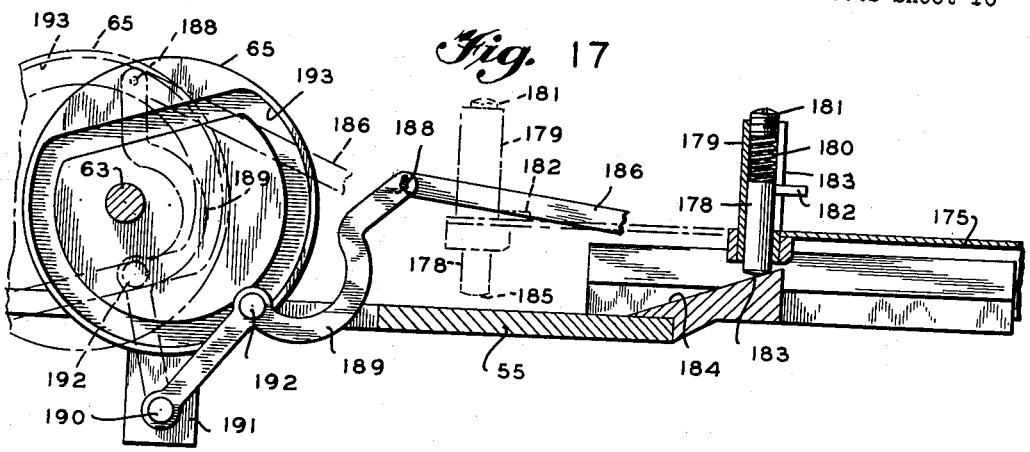
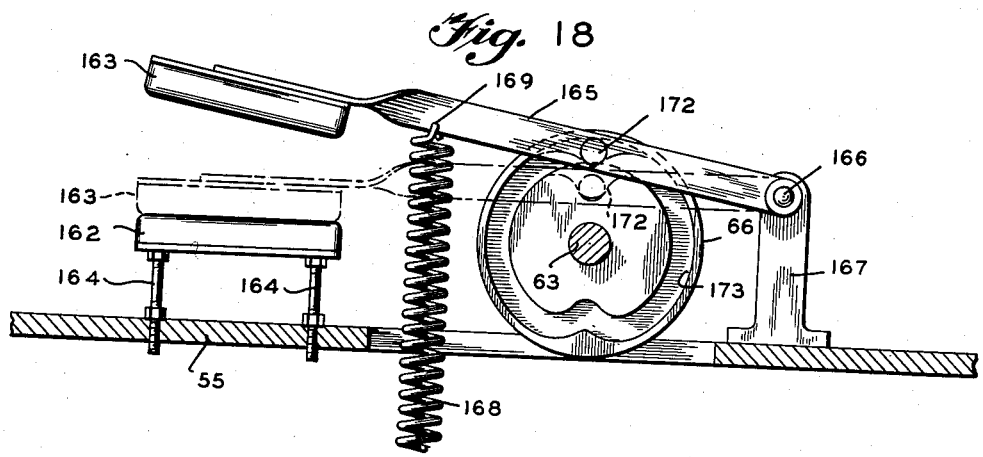
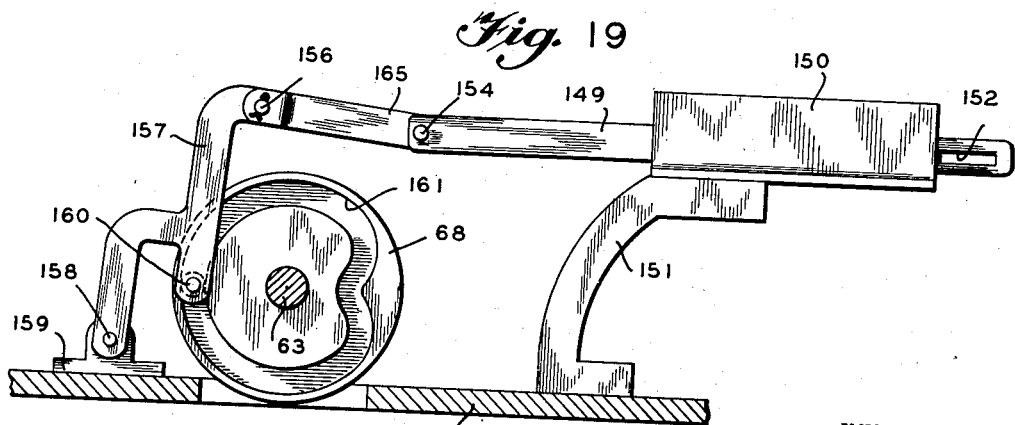
INVENTORS,
S. B. SCHWARTZ
BY JOSEPH MULLER Sept. 28, 1954   S. B. SCHWARTZ ET AL   2,690,104
COMBINATION LABELING AND MARKING MACHINE
Filed Feb. 5, 1952   17 Sheets-Sheet 11

INVENTORS
S. B. SCHWARTZ
JOSEPH MULLER

BY *A. Yates Dowell*

ATTORNEY

Sept. 28, 1954  S. B. SCHWARTZ ET AL  2,690,104
COMBINATION LABELING AND MARKING MACHINE
Filed Feb. 5, 1952  17 Sheets-Sheet 12
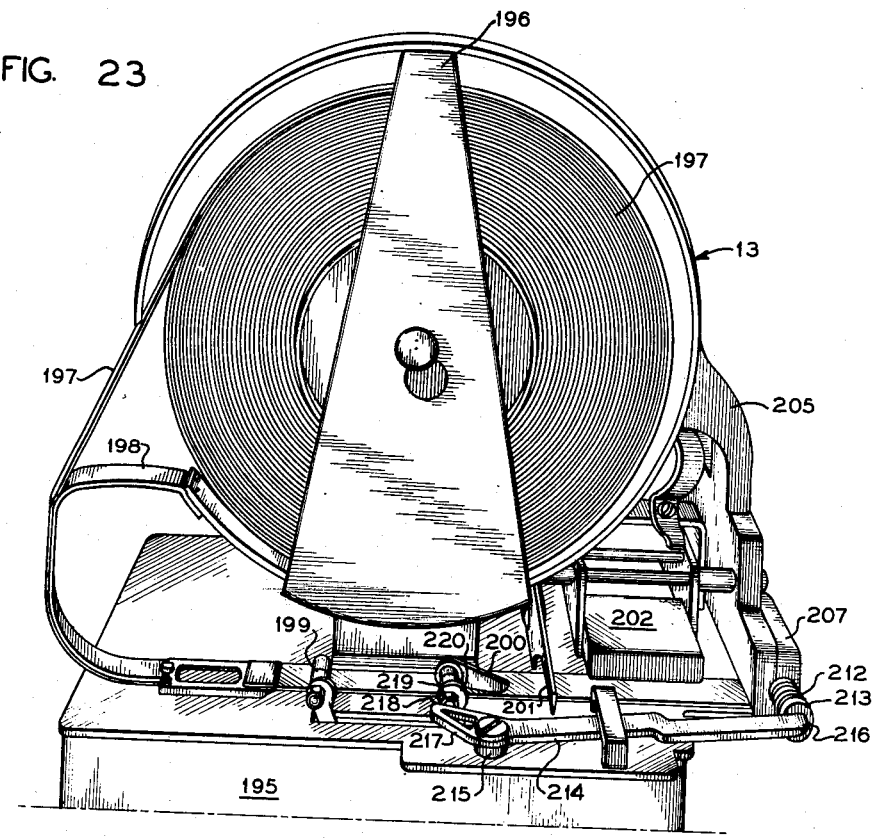
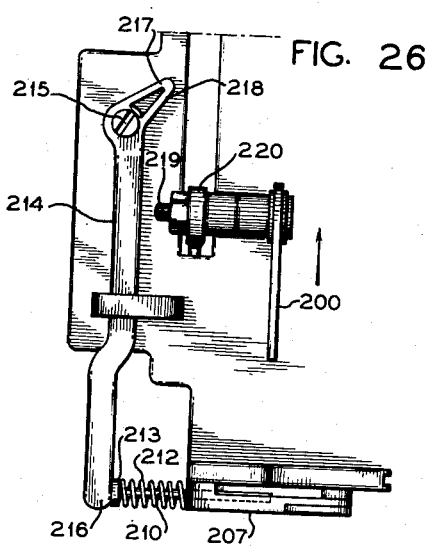
INVENTORS
S. B. SCHWARTZ
JOSEPH MULLER
BY
A. Yates Dowell
ATTORNEY Sept. 28, 1954    S. B. SCHWARTZ ET AL    2,690,104
COMBINATION LABELING AND MARKING MACHINE
Filed Feb. 5, 1952                              17 Sheets-Sheet 13
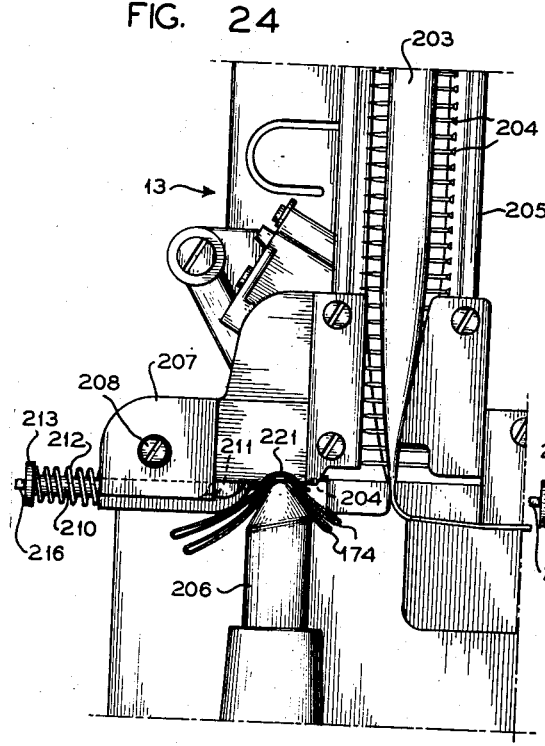
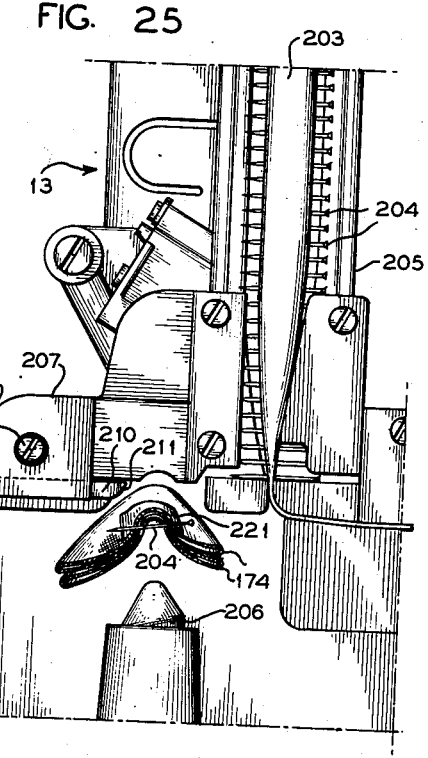
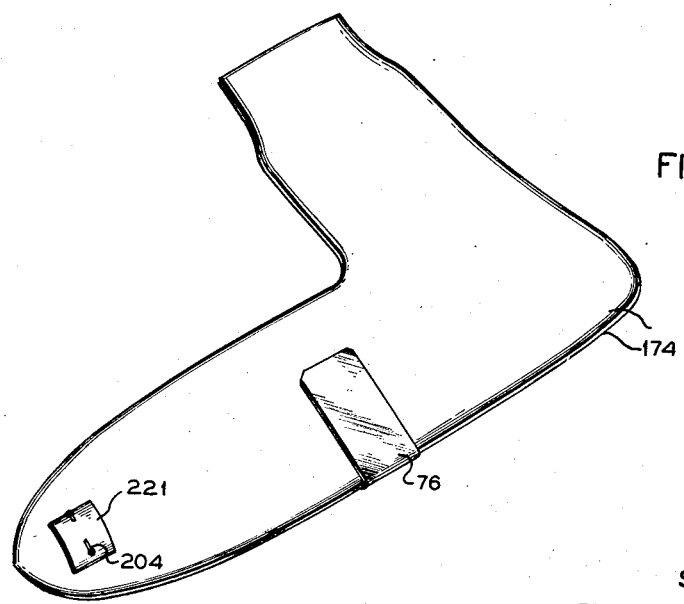
INVENTORS
S. B. SCHWARTZ
BY   JOSEPH MULLER
A. Yates Dowell
ATTORNEY Sept. 28, 1954  S. B. SCHWARTZ ET AL  2,690,104
COMBINATION LABELING AND MARKING MACHINE
Filed Feb. 5, 1952  17 Sheets-Sheet 14

INVENTORS
S. B. SCHWARTZ
BY JOSEPH MULLER
A. Yates Dowell
ATTORNEY

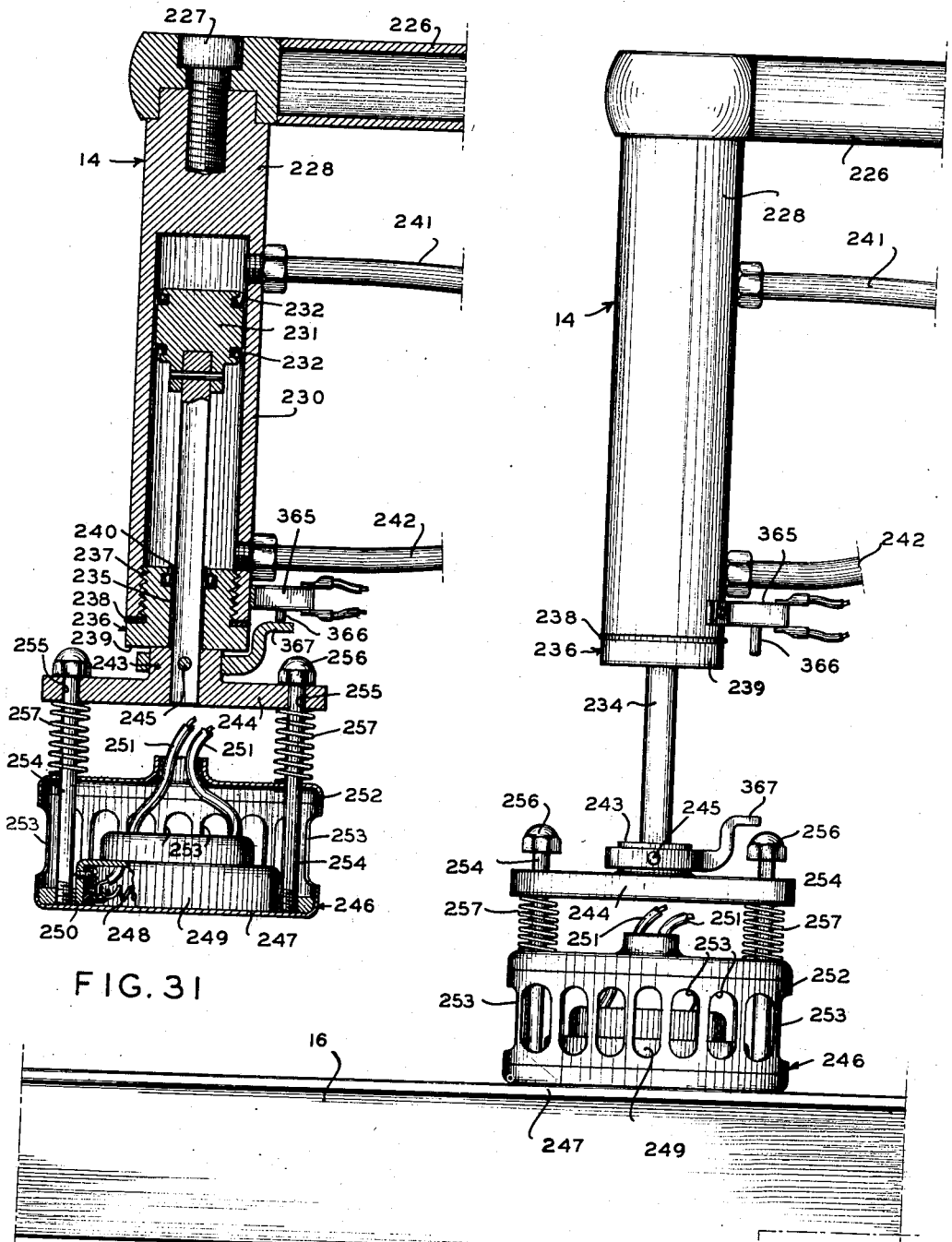

Sept. 28, 1954    S. B. SCHWARTZ ET AL    2,690,104
COMBINATION LABELING AND MARKING MACHINE
Filed Feb. 5, 1952
17 Sheets-Sheet 16
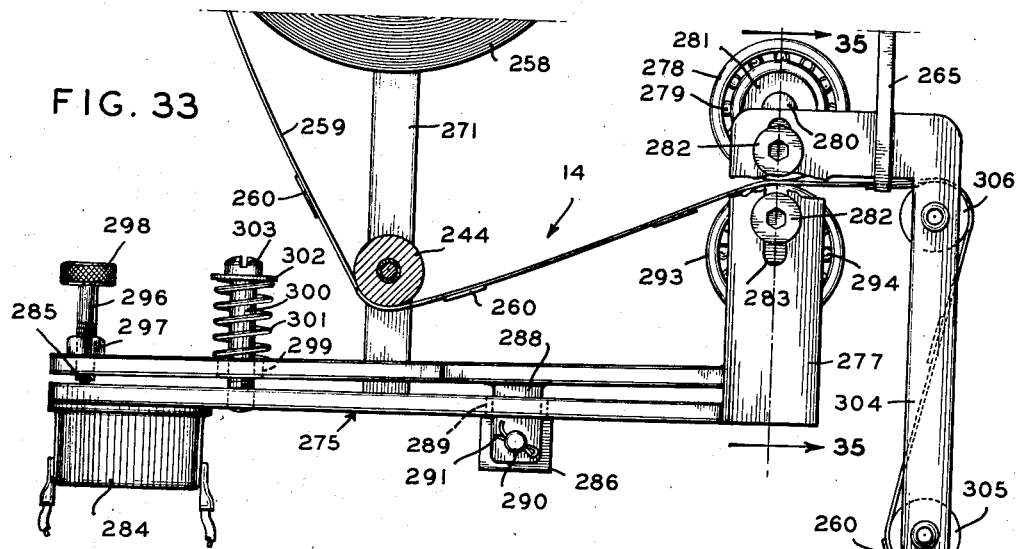
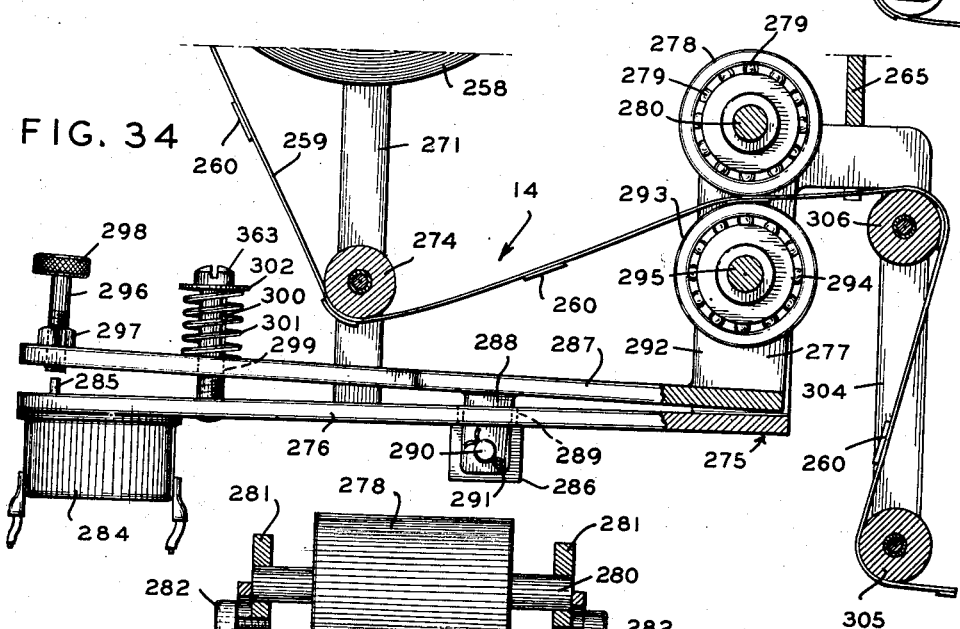
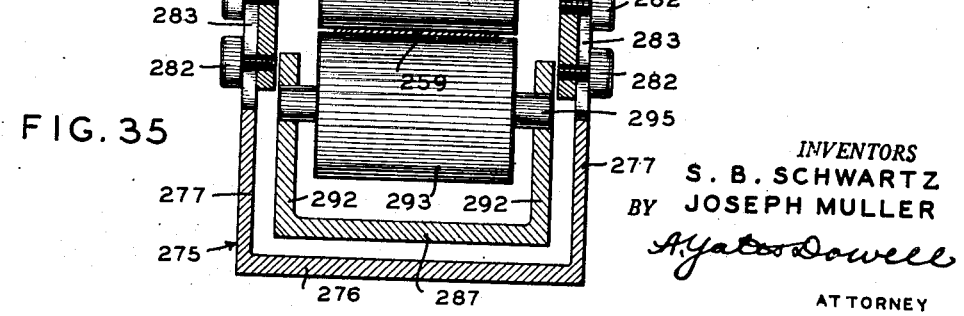
INVENTORS
S. B. SCHWARTZ
BY JOSEPH MULLER
ATTORNEY Sept. 28, 1954
S. B. SCHWARTZ ET AL
2,690,104
COMBINATION LABELING AND MARKING MACHINE
Filed Feb. 5, 1952
17 Sheets—Sheet 17
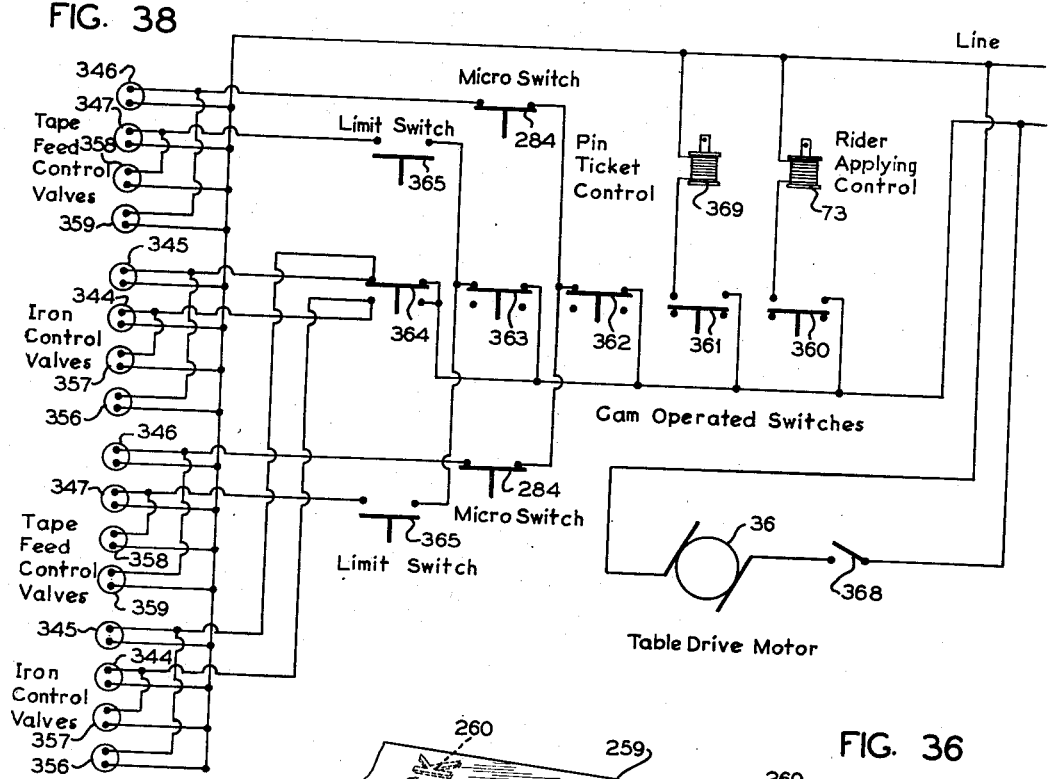
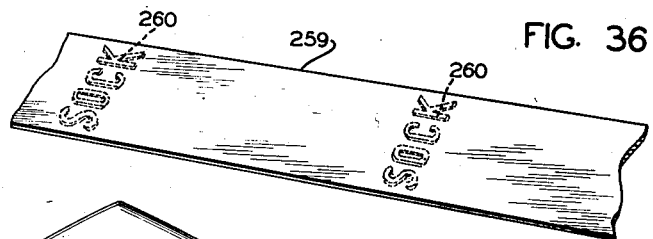
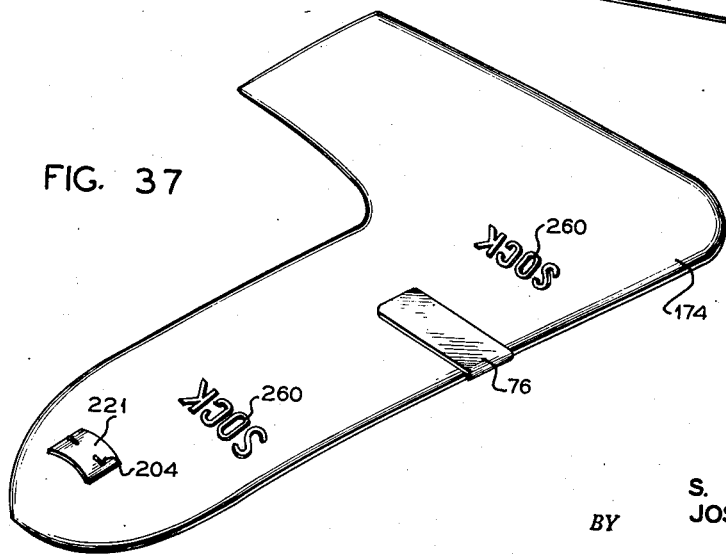
INVENTORS
S. B. SCHWARTZ
JOSEPH MULLER
BY A. Yates Dowell
ATTORNEY Patented Sept. 28, 1954

2,690,104

UNITED STATES PATENT OFFICE 2,690,104

COMBINATION LABELING AND MARKING MACHINE

Shepard B. Schwartz and Joseph Muller, Nashville, Tenn., assignors to May Hosiery Mills, Nashville, Tenn., a corporation of Tennessee Application February 5, 1952, Serial No. 270,029

20 Claims. (Cl. 93—88)

This invention relates to manufacturing and more particularly to an automatic apparatus for labeling and marking manufactured fabric articles such as hosiery. While the invention will be described in connection with the labeling and marking of hosiery it is to be understood that this is for illustrative purposes only and that the apparatus of this invention may well be utilized in labeling and marking a wide variety of articles not necessarily of fabric materials.

In the hosiery industry it has been common practice to secure pairs of socks or other hose together by a label which is termed a rider. This rider is in the form of a strip which is doubled or folded about the superposed pair of socks at any desired location, the rider being secured to the material of the socks by a suitable adhesive. The rider is intended to carry any desired indicia to indicate the origin of the socks, size, the material of which they may be made or any other desired information.

Heretofore in the hosiery industry the application of these riders has been almost universally a manual operation in which the gummed rider is grasped in the fingers of an operator, the gummed side thereof moistened and the rider applied to the pair of socks by the hands of the operator. Obviously such an operation even with highly skilled personnel is time consuming and materially contributes to the manufacturing costs of the article.

Many machines have been developed and utilized to apply labels to many types of articles but prior to the present invention no successful apparatus has been proposed which will apply riders to fabric articles such as hosiery. Various problems arise in connection with this operation such as the compressibility and resiliency of the articles, the susceptibility to damage of the articles by catching on projections or pulling the threads thereof, the problem of securely attaching the riders to the articles as well as providing an apparatus of this nature which will be substantially foolproof in operation and which will require little maintenance with consequent loss of time in production.

In connection with the rider applying operation briefly referred to above it has also been customary to apply what is known as a pin ticket to the hosiery, this operation being performed on an automatic machine in which the socks are fed to the machine manually and upon operation of a control a tag or ticket is attached to the socks by insertion of a pin through the ticket and the material of the socks.

In addition to the riders and the pin tickets referred to above it has also been customary in the hosiery industry to apply identifying marks to the hosiery by a strictly manual operation in which the desired marks are in the form of a transfer carried by a paper tape, the transfer or printing being effected by applying a hot iron to the reverse side of the tape and with the transfer ink in contact with the fabric. Needless to say this is also a time consuming and inefficient operation and has materially contributed to the manufacturing costs of such hosiery.

Also in the past numerous machines for accomplishing such marking have been proposed but these machines have presented serious drawbacks one of which is the proper registration of the printed matter with the iron for applying the same. Likewise proper iron operation to prevent scorching or burning has presented a problem with the result that no satisfactory relatively inexpensive and efficient machine for this purpose has heretofore been available.

All of the above operations have customarily been performed by a group of operators acting more or less as a team and as in all routine manual operations of this nature the work becomes very tedious and obviously as the work day progresses the efficiency of the operator will decrease and consequently an automatic apparatus which will perform all of these operations represents a valuable contribution to the industry.

Briefly stated the apparatus of this invention incorporates a circular feed table upon which socks or other articles to be labeled and marked are placed manually, the table then proceeding in step by step movements to advance the articles to each machine at which time the appropriate operation is performed. The sequence of operation is such that the operator first presents a pair of socks or other articles to the rider applying machine which automatically applies a rider thereto after which the socks are removed from this machine and placed on the feed table where they are automatically clamped in position. The table advances the socks to the pin ticket machine where a pin ticket is automatically applied thereto and thereafter the socks proceed to the first transfer printing machine at which time a transfer is applied to the socks and from this operation proceed to a second transfer machine where-by a second transfer is imprinted upon the socks. Obviously if desired the second transfer printing machine may be omitted and only one transfer applied to the articles. The operations are all automatic and in timed relation to each other.

The means for driving the feed table serving to correlate the operation of all of the machines. While the apparatus is disclosed as incorporating a circular feed table obviously other forms of feeding devices will present themselves to persons skilled in the art and therefore the description and showing of a circular feed table is for illustrative purposes only and any appropriate feeding means which will perform the necessary operations may be utilized.

It is therefore an object of this invention to provide an automatic apparatus for applying riders, pin tickets and transfers to articles such as hosiery and in which the attention of only a single operator is required.

It is a further object of the invention to provide an automatic apparatus for applying riders, pin tickets and transfer impressions to articles such as hosiery and incorporating automatic means for advancing the articles from one operation to the next, these operations being performed in sequence and in timed relation to each other.

It is a further object of the invention to provide an automatic apparatus for applying riders, pin tickets and transfer impressions to articles such as hosiery in which a plurality of such transfers may be applied at selected locations.

It is a further object of the invention to provide an apparatus for applying riders to hosiery or similar articles which is entirely automatic in operation it only being necessary for an operator to supply the articles to the apparatus and removing them therefrom, such apparatus being susceptible of operation in timed relation to other machines for performing subsequent operations.

It is a further object of the invention to provide an apparatus for automatically applying riders to hosiery or similar articles in which the riders may be supplied from a relatively large roll and accurately registered in order that all riders will be applied in a similar manner and which apparatus is susceptible of operation in conjunction with subsequent machines for performing other operations.

It is a further object of the invention to provide a pin ticket applying machine in which the socks or other articles may be automatically presented to the machine and in which the socks with the pin ticket attached are automatically ejected therefrom upon completion of the operation.

It is a further object of the invention to provide a pin ticket machine which is susceptible of automatic control for operation in timed relation with other machines for performing prior and subsequent operations and in which the socks are automatically presented to the pin ticket machine and ejected therefrom upon completion of the pin ticket applying operation.

It is a further object of the invention to provide an automatic transfer printing machine which is adapted for operation in timed relation to other machines for performing prior and subsequent operations and in which means is provided for feeding transfers in the form of a tape and in which means is also provided for automatically and accurately registering each transfer with the applying means.

It is a further object of the invention to provide an automatic transfer printing machine which may be used in conjunction with other printing machines as well as other apparatus and which may be adjusted to accommodate various types and sides of fabric articles.

It is a still further object of this invention to provide an automatic labeling and marking apparatus which may be economically constructed, which will occupy a minimum of space and which will perform operations heretofore normally performed by a plurality of operators.

Figure 22:
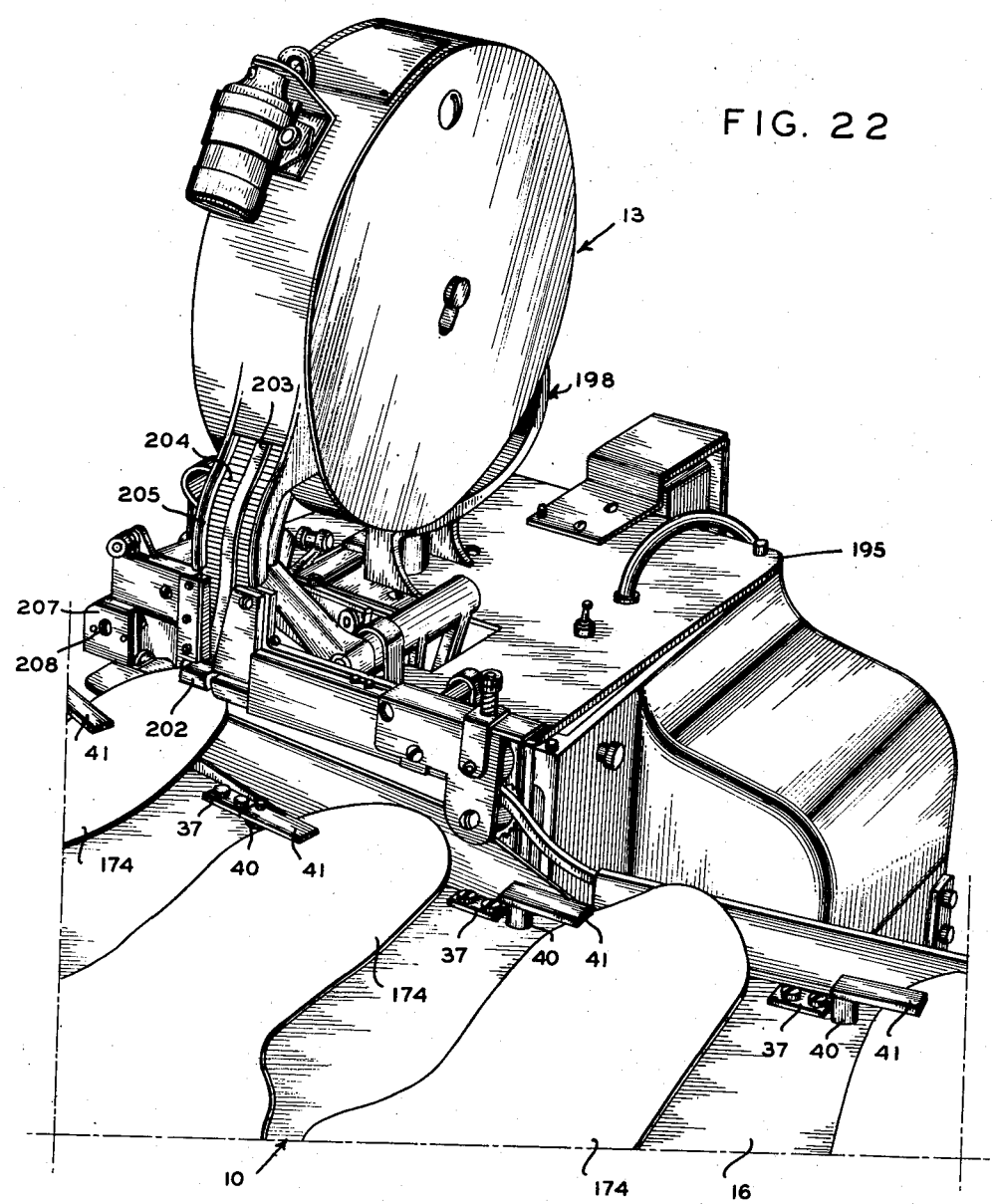
Figure 29:
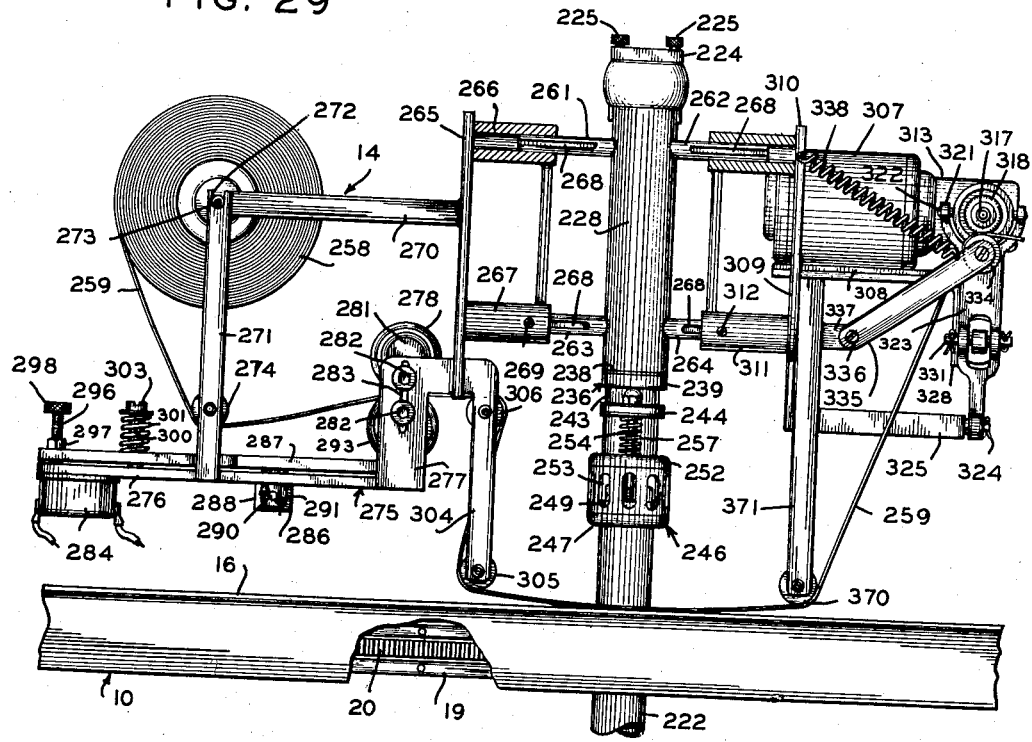
Figure 30:
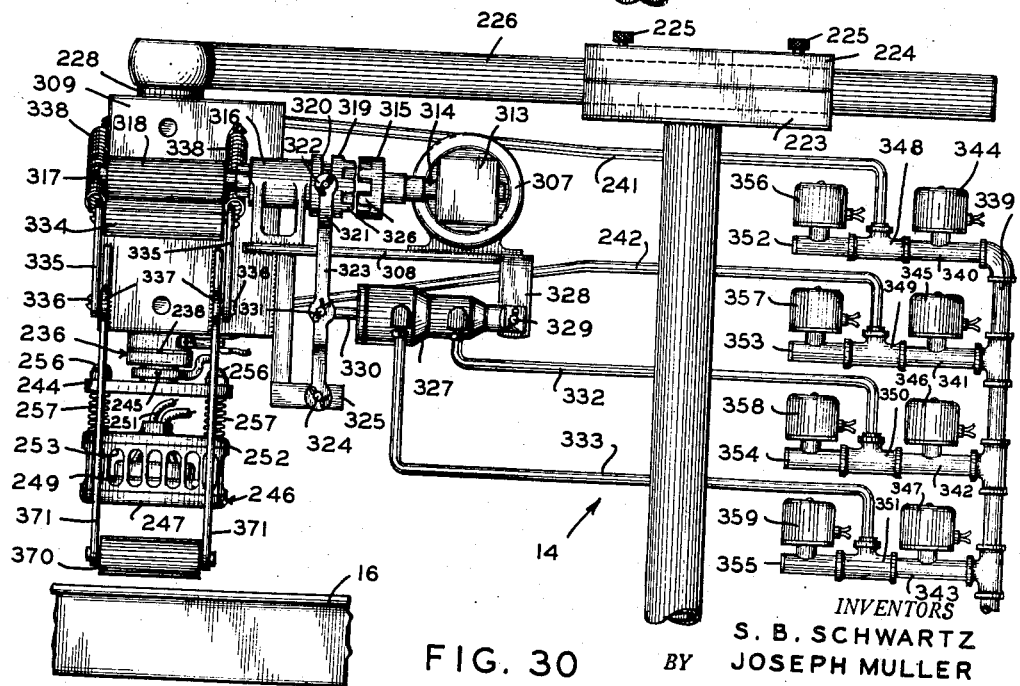

Further objects and advantages of the invention will be apparent from the following description taken in conjunction with the accompanying drawings, wherein:

Fig. 1 is a view in perspective showing the labeling and marking apparatus constructed in accordance with this invention;

Fig. 2, a top plan view of the combined labeling and marking apparatus with the individual labeling and marking machines shown in phantom and with the feeding means and drive means therefore shown in full lines;

Fig. 3, an elevational view showing the feed table and the clamping means for securely holding the articles thereon together with a portion of the driving means for the feed table;

Fig. 4, a fragmentary elevational view with parts in section for greater clarity and showing in detail the drive means for the feed table as well as the means for operating the article clamping means;

Fig. 5, a view in perspective showing the article clamping means prior to assembly with the feed table;

Fig. 6, a fragmentary sectional view showing the article clamping means assembled with the feed table and showing the internal construction thereof;

Fig. 7, a fragmentary sectional view similar to Fig. 6 but showing the article clamping means in released position and with the cam means for actuating the clamping means;

Fig. 8, a view in perspective showing the rider applying apparatus of this invention as viewed from the operator side of the machine;

Fig. 9, a side elevational view of the rider applying apparatus shown in Fig. 8;

Fig. 10, a fragmentary sectional view taken on the line 10—10 of Fig. 9 and showing the main operating parts of the rider applying apparatus;

Fig. 11, a fragmentary plan view showing the tape feeding means for the rider applying apparatus, the means for registering the tape and the means for cutting off individual riders;

Fig. 12, a fragmentary detail plan view showing the tape registration means;

Fig. 13, a sectional view taken on the line 13—13 of Fig. 11 and showing the detent control means for the tape feeding mechanism;

Fig. 14, a fragmentary side elevational view with parts in section for greater clarity and showing the manner in which the rider tape is fed and applied to the fabric articles;

Fig. 15, a fragmentary sectional view showing the drive means for the tape feed and the tape gripping and release means;

Fig. 16, a fragmentary view in perspective showing the tape gripping, feeding and releasing means;

Fig. 17, a sectional view taken on the line 17—17 of Fig. 10 and showing the drive means for the article feed table of the rider applying machine;

Fig. 18, a sectional view taken on the line 18—18 of Fig. 10 and showing the operating means for the rider applying irons;

Fig. 19, a sectional view on the line 19—19 of Fig. 10 and showing the operating mechanism for the rider cutoff knife;

Fig. 20, a view in perspective showing the riders as supplied in the form of a tape;

Fig. 21, a view in perspective showing a pair of socks with a rider applied thereto;

Fig. 22, a view in perspective showing the pin ticket apparatus constructed in accordance with this invention;

Fig. 23, a side view in perspective of the pin ticket machine and showing the feeding means for the tickets;

Fig. 24, a fragmentary front elevational view showing the socks in operative position and with a ticket and pin applied thereto;

Fig. 25, a view similar to Fig. 24 and showing the operation of the ejector to remove the socks and pin ticket from the pin ticket machine;

Fig. 26, a fragmentary top plan view showing the ejector means and the operating mechanism therefore;

Fig. 27, a detail view in perspective showing the ejector means;

Fig. 28, a view in perspective of a pair of socks having a rider and pin ticket applied thereto;

Fig. 29, a front elevational view showing the automatic transfer printing machine constructed in accordance with this invention;

Fig. 30, a side elevational view showing the printing machine of Fig. 29;

Fig. 31, a fragmentary sectional view showing the cylinder and operating piston for the transfer iron and with the iron in retracted position;

Fig. 32, a fragmentary elevational view similar to Fig. 31 but showing the iron in extended position.

Fig. 33, a fragmentary elevational view showing the control means for registration of the transfer tape and with the parts in position during the advancing movement of such tape;

Fig. 34, a view similar to Fig. 33 with part in section showing the parts in position while the transfer tape is stationary during operation of the transfer iron;

Fig. 35, a sectional view on the line 35—35 of Fig. 33;

Fig. 36, a fragmentary detail view in perspective of the transfer tape and the transfers as applied thereto;

Fig. 37, a view in perspective of a pair of socks with a rider, pin ticket and transfers applied thereto; and Fig. 38, a schematic diagram of the electrical control circuit for the apparatus of this invention.

With continued reference to the drawing there is shown in Figs. 1 and 2 a labeling and marking machine for fabric articles such as hosiery and constructed in accordance with the instant invention.

This machine includes an annular work carrying table 10 which is rotatably supported on legs 11 or other suitable supports. As shown in phantom in Fig. 2 a plurality of machines are located within the inner circumference of the table 10 and these machines comprise a rider applier 12, a pin ticket applying machine 13, a transfer printing machine 14 and a second transfer printing machine 15. All of these machines with the exception of the rider applier 12 operate on articles carried by the table 10.

Table 10 comprises an upper supporting plate 16 provided on the underside thereof with an annular trackway 17 which serves to receive rollers 18 rotatably mounted in the upper ends of legs 11. Rollers 18 serve to rotatably support the table 10 and permit movement thereof to advance the articles to be operated upon from one machine to the next.

Table 10 is also provided with a downwardly depending annular flange 19 which serves to support a circular rack 20. Rack 20 is engaged by a pinion gear 21 mounted on the upper end of a shaft 22 journalled in bearings 23 carried by the legs 11. Shaft 22 is provided adjacent the lower end thereof with a bevel gear 24 which meshes with a bevel gear 25 mounted on a shaft 26 extending from an intermittently operating one revolution clutch 27. Shaft 28 of clutch 27 is connected by a coupling 29 with a cam shaft 30 which serves to carry a plurality of cams 31. Cams 31 serve to operate control switches which will be later described. Cam shaft 30 is connected through a coupling 32 with an output shaft 33 of a reduction gearing 34 the input shaft 35 of which is connected to a drive motor 36. Motor 36 is intended to operate continuously during the operation of the machine and cam shaft 30 also operates continuously to actuate the control switches and the table 10 is moved intermittently through an angular distance determined by one revolution of the shaft 26 carrying bevel gear 25. The clutch 27 is automatically operable and intermittently rotates the shaft 26 through one revolution. The structure of clutch 27 is entirely conventional and any detailed description thereof is considered unnecessary.

In order to securely clamp articles in position on the plate 16 of table 10 during operation there are provided a plurality of work clamps 37 disposed at spaced intervals around the plate 16 adjacent the inner edge thereof. The particular structure of these work clamps is best shown in Figs. 5, 6 and 7. Clamps 37 comprise a block 38 secured beneath the plate 16 of the table 10, block 38 being provided with a vertical bore 39 which receives a plunger 40 for vertical sliding movement. Plunger 40 is provided at the upper end thereof with a clamping finger 41 which overlies a portion of the plate 16 and clamps the work such as socks between the finger 41 and the upper surface of plate 16. Block 38 is retained in position on the plate 17 and the clamping finger 41 is guided during its clamping movement by an abutment plate 42 which overlies the plate 16, abutment plate 42 having a tongue 43 extending therefrom, this tongue being received within a recess 44 in the plunger 40. Plate 42 and block 38 are secured in place on the plate 16 by screw threaded fastening means or the like 45. Disposed within the recess 44 in the plunger 40 is a compression spring 46 which engages the lower end 47 of the recess 44 and at its upper end engages the lower surface of tongue 43. The action of spring 46 serves to urge the clamping finger 41 downwardly toward the upper surface of plate 16 and thus securely clamp articles therebetween. During vertical movement of plunger 40 and clamping finger 41 the tongue 43 engages within the groove 44 and serves to prevent rotation of the plunger 40 and finger 41.

The operation of clamp means 37 is entirely automatic and is controlled by a cam 48 disposed beneath the table 10 and supported by certain of the legs 11. Cam 48 is provided with an inclined surface 49 at one end thereof, a flat intermediate surface 50 and an inclined surface 51 at the opposite end. As table 10 intermittently rotates by reason of the action of clutch 27 the inclined surface 49 of cam 48 is engaged by the lower rounded end 52 of one of the plungers 40 carrying a clamping finger 41. As best shown in Fig. 7 the end 52 rides up the inclined surface 49 and raises the clamping finger 41 away from the upper surface 16 of table 10 to release articles clamped therebetween. Upon reaching the flat horizontal surface 50 the clamping finger 41 is maintained spaced from the upper surface of plate 16 and during this portion of the travel of plate 16 articles are positioned beneath the clamping finger 41 on the upper surface of plate 16. Upon reaching inclined surface 51 the end 52 of the plunger 49 moves downwardly under the action of compression spring 46 and the clamping finger engages the articles disposed therebeneath to firmly clamp the same in place.

In order to assist in accurately positioning articles on the upper surface of plate 16 a guide or gage 53 is provided adjacent the inner edge of the plate 16, this guide or gage 53 being supported from the legs 11 or other suitable supports and being provided with an upstanding inner wall 54 against which articles may be positioned. The location of upstanding wall 54 determines the position of the articles upon the plate 16 and this wall will be so disposed that the articles will properly engage the pin ticket machine 13 and will be so positioned that the transfers impressed by the transfer printing machines 14 and 15 will be properly located on the articles.

The first operation to be performed in the apparatus of this invention is the application of labels or riders to the articles, in this case socks, and this operation is performed by the rider applying machine 12. This machine is disposed as shown in Figs. 1 and 2 and a portion thereof extends over the upper surface of table 10. The single operator which is necessary for operating the entire apparatus occupies a position substantially in front of the rider applying machine 12 and manually feeds socks to this machine and removes them therefrom. Upon completion of the application of the rider these socks are then placed upon the upper surface of plate 16 with the toes of the socks engaging the rear wall 54 of gage 53 and with a portion of the socks disposed beneath the clamping finger 41 of the clamp means 38 which in this position is in raised condition. The structure and operation of the rider applying machine 12 will now be described.

Figs. 8 and 9 disclose a rider applying apparatus constructed in accordance with this invention and having a base plate 55 which may be conveniently supported on upstanding legs or the like 56. Obviously if desired the base 55 may be supported in any other convenient manner such as from the frame consisting of the legs 11 which support the table 10 thus providing a unitary apparatus.

Mounted upon the base 55 and supported thereby is a drive motor 57 to which is attached a reduction gearing 58, the output shaft 59 of this reduction gearing serving to carry one element 60 of a one revolution clutch 61. Clutch 61 is provided with a driven member 62 which is secured to a transversely disposed cam shaft 63 rotatably supported on the base 55 by suitable bearings 64. Cam shaft 63 has fixed thereto cams 65, 66, 67 and 68, the purpose and operation of which will be later described.

As best shown in Fig. 10 one revolution clutch 61 may be of more or less conventional construction, the driving member 60 having a series of teeth 69 in the periphery thereof and the driven member 62 carrying a pawl 70 pivotally mounted at 71 on the member 62. Pawl 70 is normally urged into engagement with the teeth 69 by a tension spring 72. The operation of clutch 61 is controlled by a solenoid 73 having a plunger 74 which when the solenoid 73 is deenergized projects and engages pawl 70 to hold the same out of engagement with the teeth 69. Upon the solenoid 73 being energized to retract the plunger 74 the spring 72 moves the pawl 70 into engagement with the teeth 69 and the driven member 62 is rotated thereby until the pawl 70 again engages the projected plunger 74 to disengage the pawl 70 from the teeth 69 thus interrupting the drive from driving member 60 to driven member 62.

In operation the solenoid 73 is energized to retract the plunger 74 and initiate operation of the cam shaft 63 and the solenoid 73 is immediately deenergized which causes the plunger 74 to project into the path of movement of the pawl 70 and disengage the same from teeth 69 of the driving member 60 upon completion of a single revolution of cam shaft 63. As stated above the structure of clutch 16 is conventional and has only been described in connection with this invention in order to give a full understanding of the structure and operation thereof. Suitable one revolution clutches of other design could be substituted for the clutch 61 with equally efficient operation of the apparatus.

As shown in Fig. 20 the riders which are applied by the apparatus of this invention are supplied in the form of a tape 75, each individual rider 76 being indicated by opposed notches 77 in the edges of the tape 75. The individual riders 76 are cut off at opposed notches 77 by a mechanism to be later described. One side of the tape 75 is coated with a thermoplastic adhesive and the opposite side of the tape may be printed or otherwise inscribed with suitable indicia to convey any information which is desired.

As shown in Fig. 9 tape 75 is provided in the form of a roll 78 which is carried by a reel 79 which in turn is supported on an axle 80 carried by a bracket 81 extending outwardly from a shelf 82 projecting from an inclined trackway 83. Trackway 83 is supported from the base plate 55 by spaced upstanding posts 84 and by spaced angularly disposed brace members 85. As best shown in Fig. 16 trackway 83 provides opposed grooves 86 for slidably receiving the edges of tape 75, grooves 86 being formed by upper plates 87 and by lower plates 88. As shown in Figs. 9 and 14 tapes 75 extends from the reel 79 downwardly and under a guide roller 89 journalled in spaced brackets 90 and into the grooves 86, the tape 75 being fed downwardly through the grooves 86 in step by step movements as each individual rider 76 is applied to the work in a manner to be later described.

The mechanism for feeding the tape 75 in step by step movements is best shown in Figs. 9, 11, 14, 15 and 16 and comprises a crosshead 91 extending transversely of the trackway 83 and slidably received in suitable guideways attached thereto. Crosshead 91 is reciprocated by spaced rack bars 92 and 93 slidably received in guideways 94 in track 83.

With particular reference to Fig. 15, rack bar 93 meshes with a pinion gear 95 which is attached to a shaft 96 journalled in the upper end of posts 84. Shaft 96 also carries another pinion gear 97 adjacent the opposite end thereof which meshes with rack bar 92. Shaft 96 is driven by a gear 98 attached thereto and meshing with a vertical sliding rack 99 received within one of the posts 84. Rack 99 in turn meshes with a gear 100 carried by a transversely disposed shaft 101 journalled in a bracket 102 attached to the base plate 55, shaft 101 also carrying a pinion gear 103. Pinion gear 103 in turn meshes with a horizontally disposed reciprocating rack 104 which is slidably carried in bracket 102. With reference to Figs. 10 and 15, rack 104 carries adjacent its forward end a cam follower 105 which is disposed within a cam groove 106 in cam 67 carried by cam shaft 63.

As will be seen from an inspection of Figs. 10 and 15 upon rotation of cam shaft 63 and cam 67 rack 104 will rotate shaft 101 and thus reciprocate rack 99 which in turn rotates shaft 96 carrying gears 95 and 96 meshing with rack bars 93 and 92 respectively, reciprocation of these rack bars resulting in reciprocation of the crosshead 91.

The mechanism for feeding tape 75 as best shown in Figs. 11, 14, 15 and 16 comprises a fixed jaw 107 carried by crosshead 91 and a movable jaw 108 for cooperating with the jaw 107; jaw 108 being carried by a shaft 109 journalled in spaced bearings 110 and 111, also carried by the crosshead 91. Clamping jaw 107 is provided with a groove 112 and movable clamping jaw 108 is provided with a projection 113 complementary to the groove 112 and mating therewith. As shown in Fig. 14 when the movable clamping jaw 108 is in closed position the projection 113 engages the tape 75 and forces the same into the groove 112 in jaw 107 thus firmly gripping the tape 75 to move the same and at the same time providing a crease, the purpose of which will be later described.

Since the jaws 107 and 108 grip the tape 75 upon a downward movement of the crosshead 91 and release the same upon the return movement thereof mechanism is provided to effect movement of the jaw 108 into engagement with the tape 75 to clamp the same and this mechanism must of course operate in timed relation to the reciprocation of crosshead 91 and to the other elements of the apparatus. The mechanism for controlling operation of the clamping jaws 107 and 108 is best shown in Figs. 11, 14, 15 and 16 and comprises an arm 114 affixed to the end of shaft 109 adjacent the bearing 111. Arm 114 carries on the outer end thereof a pawl or dog 115 pivotally mounted at 116; dog 115 being normally urged in a clockwise direction as viewed in Fig. 15 by a spring or other equivalent resilient means 117 secured to the arm 114 and to the dog 115. A trip plate 118 is secured to an extending portion 119 of the trackway 83, trip plate 118 having a portion 120 disposed in the path of movement of the dog 115.

As will be seen from an inspection of Fig. 15 upon movement toward the right the dog 115 will ride upwardly over the portion 120 of the trip plate 118 until the same occupies the position to the right of the portion 120. At this time spring 117 will urge the dog counterclockwise to a position whereby upon return movement of the crosshead 91 carrying arm 114 and dog 115, the lower portion of the dog will engage the upper edge of portion 120 of trip plate 118 and rotate shaft 109 and movable jaw 108 carried thereby in a counterclockwise direction as viewed in Fig. 15 to bring the jaw 108 and projection 113 into engagement with the tape 75 to securely clamp the same in place between the groove 112 of jaw 107 and movable jaw 108. Further movement of the crosshead 91 toward the left will result in the dog 115 riding up over the portion 120 of the trip plate 118, this movement being permitted by the spring 117 after which the crosshead and clamping jaws 107 and 108 move toward the left and feed the tape 75 downwardly within the grooves 86 in the trackway 83.

Upon reaching the extreme left hand point of travel as viewed in Fig. 15 the jaws 107 and 108 must be opened to release the tape 75 and this is accomplished by an arm 121 secured to the shaft 109 adjacent the bearing 111, arm 121 serving to engage a cam 122 in the form of an inclined wedge. Cam 122 is secured to the projecting portion 119 of the trackway 83 by screw threaded fastening means or the like 123. The solid line portion of Fig. 15 shows the arm 121 immediately after engaging the cam 122 at which time the movable clamping jaw 108 has been moved away from the fixed clamping jaw 107 to release the tape 75.

Since the jaws 107 and 108 must be maintained either in a clamping position or in an open position suitable mechanism has been provided in the form of a spring pressed detent 124 slidably received in a bore 125 in the bearing 110. The details of this structure are particularly shown in Fig. 13 and the detent 124 is urged inwardly by a compression spring 126 received within a boss 127 which is screw threaded to receive an adjusting screw 128. Detent 124 engages relatively flat surfaces 129 and 130 formed on the shaft 109, the peak 131 between these flat surfaces serving to move the detent 124 outwardly upon rotation of the shaft 109 and as will be clearly seen from an inspection of Fig. 13 detent 124 will act to retain the shaft 109 and movable clamping jaw 108 in either a closed or open position depending upon which direction the crosshead 91 is moving.

As mentioned above the tape 75 is provided with notches 77 in the longitudinal edges thereof and while these notches indicate the dividing line between adjacent riders 76 notches 77 also serve an additional function of permitting an accurate registration of the riders in order that they will be cut off at the appropriate place and accurately positioned for application to the work.

As shown in Figs. 11 and 12 the mechanism for accurately positioning and registering the riders 76 may comprise a movable plunger 132 slidably mounted in a block 133 secured to trackway 83 by screw threaded fastening means or the like 134. Slidable member 132 is provided at its inner end with beveled portion 135 which is intended to mate with and register in the notch 77 in one edge of the tape 75. When in engagement with the notch 77 the beveled portion 135 serves to accurately locate the tape 75 and to prevent the movement thereof in either direction upon release of the clamping jaws 107 and 108 therefrom.

Slidable member 132 is normally held in a retracted position by a compression spring 136 disposed between a shoulder 137 on the outer end of member 132 and a portion of the block 133. Movement of the member 132 in either direction may be limited by extending portions 138 which are adapted to engage stops formed by the fastening means 134. Slidable member 132 is urged inwardly into engagement with the notches 77 by a cam 139 which is adjustably secured to the crosshead 91 by screw threaded fastening means or the like 140 engaging through a slot 141 in the cam 139. Adjustment of the cam 139 by means of the screw threaded fastening means 140 permits the member 132 to be moved inwardly into engagement with the notches 77 upon the crosshead 91 reaching its lowermost position and simultaneously with engagement of the arm 121 with cam 122 to release the clamping jaws 107 and 108 from the tape 75.

As shown in Fig. 14 the tape 75 advances downwardly through the grooves 86 of trackway 83 and passes through an aperture 142 in a cutting block 143, the function and operation of which will be presently described. Located directly below the cutting block 143 is an inwardly directed guide member 144 which serves to engage the tape 75 after it has passed through aperture 142 and to direct the same into proper operative position.

Cutting block 143 is provided with an upper shearing surface 145 and positioned in engagement with this surface is a knife blade 146 which is pivotally mounted at 147 upon the shearing surface 145. Knife blade 146 normally occupies the position shown in Fig. 11 out of engagement with the tape 75 but upon the tape reaching the position with slidable member 132 engaging in a notch 77 the knife blade 146 is actuated to swing inwardly about the pivot 147 and to shear the tape 75 at an appropriate location to sever a single rider 76 therefrom. During this movement of the knife blade 146 the same passes within a slot 148 within the block 143.

With particular reference to Figs. 10, 14 and 19 the operation of the knife blade 146 is accomplished by a bar 149 slidably received in a block 150 supported from a bracket 151 mounted on the base 55. Bar 149 is provided at its outer end with a slot 152 which serves to receive the outer end of knife blade 146 and if desired a pin 153 may be provided to link these two parts together. The opposite end of bar 149 is pivotally connected by a pin 154 with a connecting rod 155 which in turn is pivotally connected at 156 with a bell crank lever 157. Bell crank lever 157 is pivotally mounted at 158 on a bracket 159 supported on the base 55. Bell crank lever 157 also serves to carry a cam follower 160 which is received in a cam groove 161 of cam 68 carried by cam shaft 63. As will be seen from an inspection of Figs. 9, 10, 14 and 19 upon rotation of the cam shaft 63 the cam 68 and the cam groove 161 therein in engagement with the cam follower 160 will cause oscillation of the bell crank lever 157 about the pivot 158 which in turn will result in reciprocation of the bar 149, this movement in turn causing oscillation of the knife blade 146 to sever a rider 76 from the tape 75. Operation of the knife blade 146 is of course in timed relation to the operation of the other elements of the machine by reason of the fact that the operating cam 68 is carried by the cam shaft 63 which in turn actuates other cams controlling the movement of the remaining parts of the machine.

As stated above the tape 75 is provided on one side thereof with a thermoplastic adhesive coating which is heat sensitive and therefore must be applied to the fabric articles under the action of heat and pressure. For this purpose there has been conveniently provided in the apparatus of this invention a pair of heated irons 162 and 163, iron 162 being adjustably supported by bolts 164 on the base plate 55. As best shown in Figs. 10, 14 and 18 the movable iron 163 is carried by an arm 165 which is pivotally mounted at 166 on an upstanding bracket 167 secured to the base plate 55. Arm 165 and iron 163 is normally urged toward a position in engagement with fixed iron 162 by a tension spring 168 which may be secured to the arm 165 at 169 and adjustably secured to a portion of the apparatus at 170. For this purpose a cross bar 171 may be secured to the legs 56 although any other suitable securing means may be provided. The adjustment at 170 permits varying the tension of spring 168 and therefore varying the pressure with which movable iron 163 engages the work supported by fixed iron 162.

Movable iron 163 is actuated by a cam follower 172 carried by arm 165, cam follower 172 engaging in a cam groove 173 in cam 66 carried by cam shaft 63. It is to be noted that cam groove 173 is provided with such a contour that movement of the arm 165 and iron 163 carried thereby is relatively rapid there being a long dwell in which there is no movement whatsoever of this arm. Consequently upon positioning of work upon fixed iron 162 and upon rotation of the cam shaft 63 the arm 165 and movable iron 163 carried thereby will move into engagement with the rider 76 applied to the work and instantaneously press and heat this rider to securely fix the same to the article to which the rider is to be applied. Likewise the iron 163 will move rapidly away from the work and consequently prevent scorching or burning thereof. Irons 162 and 163 may be electrically heated and thermostatically controlled in a manner well known in the art and consequently it is not considered necessary to provide any showing of the electrical connections or control circuit for these irons. In Fig. 18 the movable iron 163 is shown in inoperative position in full lines and in operative position in dotted lines.

As best shown in Figs. 9, 10, 14 and 17 the socks 174 or other articles to which a rider 76 is to be applied are conveniently placed upon a work table 175 which is slidably mounted for reciprocating movement toward and from the machine upon guideways 176 secured to the base plate 55. Worktable 175 is provided in its forward edge at substantially the midpoint thereof with a relatively wide notch 177 which serves to receive the irons 162 and 163 upon a forward movement of the table 175 to bring the socks or other articles 174 into operative position between the irons 162 and 163 to permit application of a rider 76 thereto.

As best shown in Fig. 17 worktable 175 is provided with work clamping means in the form of vertically movable plungers 178 slidably received in upstanding tubular members 179 secured to the work table 175. Positioned within the tubular members 179 and engaging the upper ends of plungers 178 are compression springs 180, the compression of which may be adjusted by screw threaded plugs 181 received in the upper ends of tubular members 179. Plungers 178 are provided with arms 182 extending outwardly through slots 183 in the tubular members 179 these arms 182 as shown in Fig. 14 serving to engage the socks or other articles 174 to firmly clamp the same in place upon the upper surface of work table 175. With continued reference to Fig. 17 the plungers 178 and clamping arms 182 are actuated by cams 184 secured to the base plate 55, the upper inclined surface of these cams 184 serving to engage the lower ends 185 of the plungers 178 upon reciprocating movement of the table 175. As shown in Fig. 17 with the table 175 positioned outwardly in inoperative position the inclined surfaces of the cams 184 engage the lower ends 185 of the plungers 178 and move the same upwardly against the action of compression springs 180 thus releasing the clamping arms 182 and the socks or other articles 174 and permitting the removal of the same and positioning of a second pair of socks to which a rider 76 is to be applied. Upon movement of a table 175 inwardly to operative position as shown in dotted lines in Fig. 17 the ends 185 of plungers 178 slide down the inclined surface of cams 184 and permit movement of the clamping arms 182 into engagement with the socks 174 or other articles under the action of the compression springs 180 to securely clamp these articles in position on the upper surface of the table 175.

As best shown in Figs. 10 and 17 reciprocatory movement of the worktable 175 is accomplished by a connecting rod 186 pivotally connected at 187 to worktable 175 the opposite end of connecting rod 186 being pivotally connected at 188 to an arm 189, the opposite end 190 of which is pivotally connected at 190 to a bracket 191 secured to the base plate 55. Arm 189 serves to carry a cam follower 192 which is received in a cam groove 193 in cam 65 carried by cam shaft 63. Rotation of cam shaft 63 and cam 65 will cause oscillation of arm 189 about pivot 190 to move connecting rod 186 and table 175 connected thereto inwardly and outwardly and to position the socks 174 or other articles between the irons 162 and 163 to permit application of a rider 76 thereto. This reciprocating movement of the table 175 also clamps and releases the articles 174 by means of clamping arms 182 in a manner as described above.

As shown in Fig. 14 the tape is fed downwardly in the grooves 86 of the inclined trackway 83 by intermittent engagement of the clamping jaws 106 and 108 and the projection 113 in the movable jaw 108 pressing the tape 75 into the recess 112 in fixed jaw 107 results in forming a crease 194 in the tape 75, this crease serving as shown at the lower left hand side of Fig. 14 to place a bend in the tape 75 thus facilitating bending or folding of the rider 76 around the edges of the socks or other articles 174, when these articles are moved between the irons 162 and 163 by movement of the table 175 toward the right as viewed in Fig. 14. The folding of the rider 76 around the edges of the socks 174 or other articles results from crease 194 and the reaction of the outer surface of the rider 76 with the forward edges of the irons 162 and 163 when the edges of the socks 174 press against the rider during movement of table 175 toward the right as viewed in Fig. 14.

In operation assuming a roll of tape 78 to be supported by the reel 79 and the tape 75 to be threaded downwardly through the grooves 86 of the inclined trackway 83 and the drive motor 57 to be operating, a pair of socks 174 or other articles are placed on the upper surface of work table 175 with the portion of the socks to receive the rider 76 disposed over the notch 177 in the table 175 and with the forward portion of the socks disposed beneath the clamping arms 182 on plungers 178. With the socks 174 in place the control means is actuated to energize the solenoid 73 and retract the plunger 74 thus tripping the clutch 61 and permitting the cam shaft 63 to make one complete revolution thus causing the following sequence of operation. Rotation of cam 65 causes the arm 189 carrying the cam follower 198 disposed in cam groove 193 to oscillate about the pivot 190 thus moving the table 175 carrying the socks 174 inwardly to bring the forward edges of these socks into engagement with the rider 76 which has been detached from the tape 75 by action of the knife 146 which was actuated by rotation of the cam 68 and oscillation of the bell crank lever 157 which through bar 149 oscillates the knife 146 to perform the cutting action. Further inward movement of the table 175 causes the socks to fold the rider 76 about the forward edge of the same, this folding being facilitated by the crease 194 and by engagement of the rider with the forward edges of the irons 162 and 163. Upon disposition of the socks 174 with the rider folded thereabout between the irons 162 and 163 rotation of cam 66 engaging cam follower 172 carried by the arm 165 will result in moving the iron 163 into engagement of the upper surface of the rider folded about the socks and pressing of the rider and socks between the iron 162 and 163. Since these irons are in a heated condition the thermoplastic adhesive applied to the inner surface of the rider 76 will be activated to firmly attach the rider 76 to the socks 174. Continued rotation of the cams 66 and 65 will result in the movable iron 163 being moved upwardly and away from the rider 66 and retraction of the table 175 to move the socks 174 and rider 76 carried thereby to a position where the socks may be removed from the table the clamping arms 182 being released by engagement of the plungers 178 with cams 184 which raise the plungers upwardly and release the clamping arms 182.

During retracting movement of the table 175 the cam 67 operates to move the rack 164 and through the associated racks and pinions to reciprocate crosshead 91 carried by the inclined trackway 83 movable jaw 108 closing to clamp the tape 75 therebetween and advance the same to bring a new rider 76 into position. The operation of the clamping jaw 108 is fully explained above and further explanation is not considered necessary. Upon completion of one revolution of cam shaft 63 the clutch 61 is disengaged and the apparatus comes to rest. As will be noted from the above explanation one revolution of the cam shaft 63 is all that is necessary to complete the application of a single rider to a pair of socks or other articles and to advance the tape 75 to bring a new rider into a position for application to the next pair of socks. While normally it is intended that the socks 174 will be manually positioned on the table 175 and removed therefrom, obviously if desired automatic conveying means could be provided which would operate in timed relation to the rider applying apparatus to feed such socks into position and to remove them therefrom.

It will be seen that by the above described invention there has been provided an efficient compact machine for applying labels in the form of riders to socks or other articles, the apparatus operating from a single source and being controlled by a single electric switch which may be automatically actuated in timed relation with other apparatus or which may be manually actuated to perform simply the rider applying operation. It is susceptible of being fabricated from readily available parts and materials and may be so constructed as to preclude frequent breakdowns and the necessity for extensive maintenance thus materially contributing to the efficient and low cost application of riders to hosiery or other articles.

The pin ticket machine 13 utilized with the apparatus of this invention is basically a conventional machine which, however, has been modified to a certain extent to permit proper operation where the socks to which the pin tickets are to be attached are automatically fed to the pin ticket machine and away therefrom. Only a brief description will be given of the basic features of the pin ticket machine, this description being sufficient in connection with the detailed description of the novel modifications, in order to permit a full and complete understanding thereof.

The pin ticket machine 13 comprises a base 195 which serves to house the majority of the operating mechanism and upstanding above the base is a bracket 196 for receiving and supporting a roll of tape 197 which tape provides the tickets to be affixed to the socks or other articles. As best shown in Fig. 23, the tape 197 is fed from the roll downwardly and around a guide 198 located adjacent the rear of the machine, the tape being fed forwardly toward the front of the machine by pawls 199 and 200. Located adjacent the front of the machine and above the tape 197 is a knife 201 which is actuated at regular intervals to cut individual tickets from the tape 197. Also located adjacent the front of the machine is a printing mechanism 202 by means of which suitable indicia may be inscribed upon each individual ticket.

The bracket 196 also serves to support a roll of tape 203 which carries pins 204, tape 203 being fed downwardly through a guide 205 to a position where each individual pin 204 is in alignment with a pin driver (not shown). The operation of the pin ticket machine is best shown in Figs. 24 and 25 and as will be seen from an inspection of these figures, a vertically movable work support 206 serves to receive the socks 174 to which a ticket is to be attached and to move these socks upwardly into ticket-receiving position. This position is shown in Fig. 24 and Fig. 25 shows the work support 206 retracted and a ticket attached to the socks 174 which have been ejected from the machine in a manner to be presently described.

The novel ejecting apparatus for ejecting the socks and pin ticket from the machine is best shown in Figs. 24, 25, 26 and 27 and comprises a block 207 secured to the front of the machine by screw threaded fastening means or the like 208, this block having a guideway 209 therein for slidably receiving an ejector bar 210. Bar 210 is provided with a beveled end 211 which operates to eject the socks and pin ticket from the machine in a manner to be presently described. Bar 210 is normally held in retracted or inoperative position by a compression spring 212 received over the bar 210 between a head 213 and the block 207.

As best shown in Figs. 23 and 26, the ejector bar 210 is actuated by a bell crank lever 214 pivotally mounted at 215 on the base 195, one end 216 of the bell crank lever 214 being positioned in contact with the head 213 of the ejector bar 210 and the opposite end 217 of the bell crank lever 214 being provided with a cam surface 218 which is engaged by the pivot pin 219 carrying the tape feed pawl 200 on an oscillating arm 220. Upon rearward movement of the arm 220 in the direction of the arrow as shown in Fig. 26, the pin 219 engages the cam surface 218 to oscillate the bell crank lever 214 in a counterclockwise direction which will result in moving the ejector bar 210 inwardly against the action of compression spring 212 and as shown in Fig. 25 the beveled end 211 of the ejector bar 210 will engage the ticket 221 which has been attached to the socks 174 by the pin 204 and due to the shape of the beveled end 211 the ticket 221 and socks attached thereto will be ejected downwardly from the pin driving position. Were this ejector not provided, the ticket and socks attached thereto would have a tendency to stick within the machine in pin driving position and would necessitate an operator removing the same.

With the provision of the novel ejector mechanism above described, the pin ticket machine is adapted for use in an automatic apparatus such as that of this invention, in which the socks are fed to a position above the work support 206 and are thereafter moved into position to receive the ticket and pin, and upon operation of the ejector bar 210 the socks move downwardly and may be conveyed to the next operation.

Fig. 28 shows a pair of socks after completion of the pin ticket operation, in which a rider 76 has been applied thereto and also a ticket 221 has been secured in place by the pin 204.

Since the transfer printing machines 14 and 15 are identical, only one of these machines will be described.

With particular reference to Figs. 29, 30 and 31, there is shown an automatic transfer printing machine constructed in accordance with this invention and comprising a supporting standard 222 upon the upper end of which may be secured by welding or the like a block 223. A complementary block 224 may be secured to the upper surface of block 223 by screw threaded fastening means 225. The abutting faces of the blocks 223 and 224 may be provided with longitudinal complementary recesses which serve to slidably receive and clamp in adjusted position a horizontally extending supporting member 226. Secured to one end of supporting member 226 by a screw threaded fastening means 227 is a vertically disposed cylinder 228 from which the remainder of the mechanism is supported.

As best shown in Fig. 31, cylinder 228 is provided with a bore 230 which serves to slidably receive a piston 231 having packings 232 at each end thereof. Secured to the piston 231 by a pin or the like 233 is a piston rod 234 which is slidably received in an aperture 235 in an end closure 236 threadedly engaged with the lower end of the cylinder 228 at 237. In order to provide a fluid tight seal at the lower end of the cylinder 228, a gasket 238 may be positioned between an annular flange 239 and the lower edge of cylinder 228, gasket 238 being tightly clamped in place by the screw threaded engagement 237. Also, in order to prevent leakage of fluid from within the cylinder 228 around piston rod 234, there may be provided a packing 240 secured to the closure 236 and slidably engaging the surface of the piston rod 234 to prevent leakage of fluid from the bore 230 of cylinder 228. Obviously, if desired, other types of packing 240 may be employed such as the conventional gland or stuffing box but with the pressures employed in this apparatus in all probability a packing 240 of the oil seal type will be satisfactory. Fluid pressure is supplied to the upper end of bore 230 through a conduit 241 and to the lower end of bore 230 through a conduit 242.

The lower end of piston rod 234 extends through an aperture in a boss 243, projecting from the upper surface of a crosshead 244. Piston rod 234 may be secured to the crosshead 244 by a pin or other equivalent means 245.

Supported from the crosshead 244 for movement therewith is a transfer iron 246 of more or less conventional construction and which may conveniently include a transfer contacting shoe 247 which is heated by an electrically heated element 248 disposed within a casing 249. The end of heating element 248 may be secured to a terminal strip 250 which facilitates connection to electrical conductors 251 extending to a source of electrical energy. In order to protect the operator from burns, the iron 246 may be provided with a housing 252 enclosing the same, this housing having a plurality of apertures 253 which serve to dissipate the heat, the housing 252 remaining relatively cool and even if contacted by the operator would not result in a painful burn.

Iron 246 is supported from crosshead 244 for vertical movement therewith and also for vertical movement relative thereto by means of upstanding rods 254 threadedly received in the shoe 247, rods 254 extending upwardly through apertures 255 in the crosshead 244. The rods 254 may be provided with heads 256 disposed above the upper surface of crosshead 244 in order to limit downward relative movements of the iron 246. Disposed above the rods 254 and between the lower surface of crosshead 244 and the upper surface of housing 252 are compression springs 257, which upon downward movement of the iron 246 into engagement with an article permit the same to move upwardly with relation to the crosshead 244 and compress the springs 257 in order to exert a resilient pressing force upon such articles. Iron 246 is, of course, moved vertically by the introduction of fluid pressure through conduits 241 and 242 to the appropriate ends of bore 239 in cylinder 228.

Transfers for use in the machine of this invention are supplied in the form of a roll 258 of paper or other suitable tape 259, this tape having printed thereon with suitable ink a design or lettering 260 as shown in Figs. 33, 34 and 36. Since it is necessary that the tape 259 be fed to present successive transfers to the action of iron 246 and further, since the design or lettering 260 must register precisely with the iron 246, suitable means is provided for feeding and registering such transfers.

Extending from opposite sides of the cylinder 228 are upper horizontal rods 261 and 262 and lower horizontal rods 263 and 264. Slidably received on rods 261 and 263 is a bracket 265 which is provided with outwardly extending tubular members 266 and 267 which are received over the rods 261 and 263 respectively. The rods 261, 262, 263 and 264 may be provided with flats 268 and such flats may be engaged by a set screw or the like 269 to secure the bracket 265 in adjusted position. Secured to the bracket 265 by welding or the like are a pair of spaced parallel horizontal bars 270 which, in conjunction with vertically spaced parallel arms 271 serve to support the roll 258 by means of a U-shaped recess 272 in the upper end of each arm 271, recesses 272 serving to receive the end of axle 273 extending through the roll 258. A guide roll 274 for the tape 259 is also journalled between the arms 271, below the roll 258.

Secured to the lower end of bracket 265 by welding or the like is a fixture 275 which is best shown in Figs. 29, 33, 34 and 35, comprises a base plate 276 which is secured to the lower end of vertically extending arms 271 by welding or the like, base plate 276 being provided at one end thereof with upwardly extending spaced parallel ears 277. Mounted for vertical adjustment on the ears 277 is a roll 278 which may be provided with anti-friction bearings 279, roll 278 having an axle 280 received in end plates 281, plates 281 serving to receive screw threaded fastening means or the like 282 which extend through vertical slots 283 in the ears 277. As will be seen from an inspection of Fig. 35, roll 278 may be moved vertically by loosening the screw threaded fastening means 282 to permit vertical sliding movement thereof in the slots 283 and upon proper adjustment of the roll 278 the screw threaded fastening means 282 may be tightened to securely clamp the roll 278 in adjusted position. At the opposite end of base plate 276 from the upstanding ears 277, a micro-switch 284 is secured to the undersurface thereof and the actuating plunger 285 of the micro-switch 284 extends upwardly through an aperture in a base plate 276. Also secured to the base plate 276 are downwardly depending spaced ears 286, the purpose of which will be presently described.

A rocker arm 287 is pivotally mounted on the base plate 276 by means of a depending boss 288 extending through an aperture 289 in the base plate 276, boss 288 being pivotally received on a shaft 290 supported by the depending ears 286. Shaft 290 may be secured in place by a cotter key or other equivalent fastening means 291. Rocker arm 287 is provided at one end with spaced upstanding ears 292 which are received between the upstanding ears 277 on base plate 276. Ears 292 serve to rotatably support a roll 293 which may be provided with anti-friction bearings 294 this roll being supported by an axle 295 extending through apertures in the ears 292. Roll 293 is located directly below roll 278 and is designed to cooperate therewith in a manner to be later described.

At the opposite end of rocker arm 287 a push rod 296 in the form of a screw threaded member is threadedly received in the rocker arm 287 and projects downwardly therethrough, directly above plunger 285 of micro-switch 284. Push rod 296 is provided with a lock nut 297 which serves to engage the upper surface of rocker arm 287 and lock the push rod 296 in adjusted position, whereby the point of operation of the micro-switch 284 may be determined. Push rod 296 is also provided with a finger engaging knob 298 to facilitate convenient adjustment thereof.

An aperture 299 is provided in rocker arm 287 between the push rod 296 and the pivot shaft 290, aperture 299 serving to receive an upstanding bolt 300 secured to the base plate 276 bolt 300 having received thereon above the rocker arm 287 a compression spring 301 which engages a washer 302 disposed beneath the head 303 of the bolt 300. Compression spring 301 engages the upper surface of rocker arm 287 and tends to bias the same in a counter-clockwise direction as viewed in Figs. 29, 33 and 34, to urge the push rod 296 into engagement with the plunger 285 of micro-switch 284. The tension of spring 301 may be adjusted by turning movement of the bolt 300. Also secured to the lower end of bracket 265 by welding or the like are depending spaced parallel arms 304 which serve to rotatably support vertically spaced guide rollers 305 and 306. Guide rollers 305 and 306 are provided for the purpose of receiving and guiding tape 259 in a manner to be later described. The mechanism just described provides the registration means for insuring that the lettering 260 will be positioned directly beneath the iron 246 and the operation of this registration mechanism will be described in connecttion with the description of the operation of the entire printing machine.

Automatically operable tape-pulling means for advancing tape 259 after each transfer is applied is provided and may take the form of a motor 307 mounted upon a shelf 308 attached to a bracket 309 by welding or the like. Bracket 309 is provided with spaced parallel tubular members 310 and 311, these tubular members being slidably received on rods 262 and 264 secured to the cylinder 228. Tubular members 310 and 311 are provided with set screws 312 which engage the flats 268 on the rods 262 and 264 to securely lock bracket 309 and associated equipment in adjusted position.

Motor 307 is provided with a reduction gear 313 from which extends a power output shaft 314 on which shaft is mounted a clutch jaw 315. A journal bearing 316 mounted upon shelf 308 serves to rotatably support a roll shaft 317 in axial alignment with the power output shaft 314. Mounted upon roll shaft 317 is a serrated roll 318. A driven clutch jaw 319 is slidably mounted on the end of roll shaft 317 adjacent clutch jaw 315, jaw 319 being arranged to cooperate therewith. An annular groove 320 is provided in the outer surface of jaw 319 and a clutch operating yoke 321 partially embraces the jaw 319 and is provided with pins 322 which extend into the groove 320 from opposite sides. Yoke 321 is provided with a downwardly extending arm 323 which is pivotally mounted at 324 on a bracket 325 secured to the shelf 308. Pivotal movement of the arm 323 serves to engage or disengage the cooperating teeth 326 on the jaws 315 and 319.

In order to control the operation of the movable clutch jaw 319 there is provided a fluid pressure cylinder 327 pivotally mounted at one end thereof by a pivot pin or other equivalent means 329 on a bracket 328, depending from shelf 308. A piston rod 330 projects from the opposite end of cylinder 327 and is pivotally secured to the arm 323 by a suitable connection such as a pivot pin 331. The piston rod 330 connects to a piston of the double acting variety, disposed within the cylinder 327. A conduit 332 provides fluid pressure for one end of the cylinder 327 and a second conduit 333 provides fluid pressure for the opposite end of cylinder 327.

The tape 259 is held in engagement with the serrated roller 318 by an idler roll 334 rotatably mounted between spaced parallel arms 335 which in turn are pivotally mounted at 336 on spaced ears 337 extending from bracket 309. Idler roll 334 exerts a resilient pressure on tape 259 to urge the same into engagement with serrated roll 318 by reason of tension springs 338 connected to arms 335 and to bracket 309.

A main fluid pressure supply line 339 is provided with a plurality of branch lines 340, 341, 342 and 343 and the passage of fluid through such branch lines is controlled by solenoid valves 344, 345, 346 and 347 respectively. The outlet sides of valves 344, 345, 346 and 347 are each connected to T fittings 348, 349, 350 and 351. Fluid pressure exhaust outlets 352, 353, 354 and 355 are connected to the T fittings 348, 349, 350 and 351 respectively and the flow of fluid through such exhaust outlets is controlled by solenoid valves 356, 357, 358 and 359 respectively. Conduits 241 and 242 which supply fluid pressure to the opposite ends of cylinder 228 are connected to T fittings 348 and 349 respectively and conduits 332 and 333 which supply fluid pressure to opposite ends of cylinder 327 are connected to T fittings 350 and 351 respectively. The solenoid valves are energized in the proper sequence to perform the necessary operations of the machine and the electrical control circuit and manner of operation of this circuit will be later described.

The control circuit for the entire labeling and marking machine as shown schematically in Fig. 38 includes in addition to the micro-switches 234 for each transfer printing machine cam operated switches 360, 361, 362, 363 and 364 which are operated by the cams 31 carried by cam shaft 30, a limit switch 365 on each transfer printing machine, the limit switch being secured to the cylinder 228 and having an operating plunger 336 engageable by a finger 367 carried by the boss 243 on the crosshead 244 and secured in place by the pin 245. Finger 367 is operative to engage the plunger 366 and operate the switch 365. When the iron 246 is in uppermost position and upon downward movement of the iron 246, the finger 367 is disengaged from the plunger 366 and allows the switch 365 to return to its normal, inoperative condition. The table drive motor 36 is controlled by a switch 368 and this motor runs continuously during the operation of the machine.

In the operation of the labeling and marking apparatus of this invention, and assuming the table drive motor 36 to be operating, the table 10 will rotate intermittently a predetermined distance by reason of the action of the clutch 27 and the operator will place a pair of socks on the work table 175 of the rider applying machine 12. Since the cam shaft 30 carrying cams 31 operates continuously, the cam operated switch 360 will be closed to energize solenoid 73 and initiate operation of the rider applying machine 12 which will cause a rider 76 to be applied to the pair of socks 174.

Upon completion of the rider applying operation, the socks are removed from the table 175 and placed on the circular table 10 beneath one of the clamping means 37 and with the socks positioned against the gage 53 to properly locate the same. The socks will then be carried to the pin ticket machine 13 and upon reaching this position cam operated switch 361 will be closed to energize solenoid 369 which initiates operation of the pin ticket machine 13. Upon completion of the application of a pin ticket 221 to the socks 174, the socks are carried to the first transfer printing machine 14 and are advanced beneath the tape 259 carrying the transfers 260, tape 259 being guided by roller 370 supported from spaced arms 371 which are attached to the bracket 309.

Each pair of socks to be printed comes to rest beneath the tape 259 and directly beneath the iron 246. At this time cam operated switch 364 closes to energize solenoids 344 and 357 which admit fluid pressure through conduit 241 to the upper end of the cylinder 228, thus moving the iron 246 downwardly to transfer the design or lettering 260 from tape 259 to the socks 174. Upon completion of this printing operation, cam operated switch 364 closes a second set of contacts to energize solenoid 345 and solenoid 356 thus introducing fluid pressure to the lower end of cylinder 228 and retracting iron 246. Solenoid valves 357 and 356 permit the escape of fluid pressure from the cylinder 228 during movement of the piston 234 in such cylinder. The table 10 then moves another step to present a second pair of socks to be printed.

Since the transfer 260 is only sufficient for one printing operation, it is necessary to advance the tape 259 and bring a second transfer into registry with the iron 246 after the completion of a printing operation. This advancement of the tape 259 is accomplished by the mechanism above described and the exact registry of the transfer 260 is obtained by actuation of the micro-switch 284. Actuation of this switch is caused by the transfer 260 passing between the rolls 278 and 293, the thickness of the transfer ink being sufficient to move these rolls apart and pivot the rocker arm 287 about the pivot 290, thus moving the push rod 296 away from the plunger 285 of micro-switch 284 and allowing this switch to close.

Assuming that a printing operation has just been completed, and a transfer 260 is disposed between the rolls 278 and 293 with the micro-switch 285 closed to complete the circuit to solenoid valves 346 and 359 at this time cam operated switch 362 is open in order to interrupt the circuit to these solenoid valves and prevent energization of the same. Upon return of iron 246 to its uppermost position the finger 367 will engage plunger 366 of limit switch 365 closing this switch to energize solenoid valves 347 and 358 thus admitting fluid pressure to one end of the cylinder 327 and engaging the driven clutch member 315 with the driving clutch member 319 to rotate drive roll 318 and advance the tape 259 through the rolls 278 from the tape supply roll 258.

As soon as the transfer 260 has passed between rolls 278 and 293 these rolls move toward each other under the action of spring 301 to open the micro-switch 284 and at the same time cam operated switch 362 closes to supply current to this circuit in order that when the next transfer 46 passes between rolls 278 and 293 and closes micro-switch 284 this will operate the energize solenoid valves 346 and 359 which will disengage driven clutch member 315 from driving clutch member 319 and stop the rotation of serrated roll 318 and the movement of tape 259 which results in accurately registering or positioning a transfer 260 beneath the iron 246. During the advancement of the tape 259 cam operated switch 363 opens which deenergizes solenoid valves 347 and 358 but the driving clutch member 315 will not be disengaged from driven clutch member 319 until micro-switch 284 closes since it is necessary to introduce fluid pressure to the opposite end of the solenoid 347 in order to accomplish such disengagement of the tape pulling drive clutch.

It will be seen that it is impossible for the tape 259 to be moved during downward movement of the iron 246 to initiate a printing operation since immediately the iron 246 commences to move downwardly the finger 367 is disengaged from the plunger 366 thus opening the limit switch 365 and preventing introduction of fluid pressure to the cylinder 327 to engage the driving clutch member 315 with the driven clutch member 319. This movement is only initiated on the upward movement of the iron 246 to close the limit switch 365 after which movement of the tape 259 is completely under control of the micro-switch 284 actuated by the transfer 260 passing between the rolls 278 and 293.

The operation of the second transfer printing machine 15 is identical with that described above and this machine operates simultaneously with the first printing machine 14 by reason of the fact that the same cam operated switches are utilized to control this machine; the two printing machines 14 and 15 being in effect connected in parallel. A pair of socks 174 which have been labeled and marked by the apparatus of this invention are shown in Fig. 37, this pair of socks having applied thereto a rider 76, a pin ticket 221 and two transfers 260. As stated above the transfers 260 may be positioned in any desired location on the socks and it is only necessary to adjust the transfer printing machines 14 and 15 to accomplish any desired positioning of this transfers. Obviously the apparatus of this invention obviates the necessity for utilizing a plurality of operators since only one operator is necessary to control and operate the entire machine. This obviously results in a material saving in the cost of manufacture and also eliminates the necessity of training personnel to perform manual operations which this apparatus eliminates.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A combined labeling and marking apparatus comprising an annular feed table, a continuously operating drive motor, a cam shaft connected to said motor, a plurality of cams on said cam shaft, a plurality of switches operated by said cams, an automatic intermittently operable one revolution clutch connected to said motor, drive means connecting said clutch and said table whereby upon operation of said clutch said table will be rotated a predetermined distance, work holding means on said table comprising vertically movable plungers disposed adjacent the inner edge of said table, an arm on each plunger for clamping work therebetween and the upper surface of said table, resilient means for biasing said arms toward clamping position, fixed cam means engageable with said plungers upon rotation of said table for moving said arms to release said work, a gage adjacent the inner edge of said table for facilitating the location of work thereon, a rider applying machine disposed within said feed table and having a work table extending over said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom; ejecting means on said pin ticket machine for ejecting work therefrom after application of a pin ticket, a first transfer printing apparatus disposed over said feed table for successively applying transfers to work clamped on said feed table, a second transfer printing apparatus disposed over said feed table for successively applying transfers to work clamped on said feed table, means for adjustably positioning each transfer apparatus to locate said transfers in any desired position on the work and electrical connections between said pin ticket machine and each transfer apparatus and others of said cam operated switches to initiate operation thereof while said feed table is at rest whereby riders, pin tickets and transfers are automatically applied to the work.

2. A combined labeling and marking apparatus comprising an annular feed table, a drive motor, a cam shaft connected to said motor, a plurality of cams on said cam shaft, a plurality of switches operated by said cams, an automatic intermittently operable one revolution clutch connected to said motor, drive means connecting said clutch and said table whereby upon operation of said clutch said table will be rotated a predetermined distance, work holding means on said table comprising vertically movable plungers disposed adjacent the inner edge of said table, an arm on each plunger for clamping work therebetween and the upper surface of said table, resilient means for biasing said arms toward clamping position, fixed cam means engageable with said plungers upon rotation of said table for moving said arms to release said work, a gage adjacent the inner edge of said table for facilitating the location of work thereon, a rider applying machine disposed within said feed table and having a work table extending over said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a first transfer printing apparatus disposed over said feed table for successively applying transfers to work clamped on said feed table, a second transfer printing apparatus disposed over said feed table for successively applying transfers to work clamped on said feed table, means for adjustably positioning each transfer apparatus to locate said transfers in any desired position on the work, and electrical connections between said pin ticket machine and each transfer apparatus and others of said cam operated switches to initiate operation thereof while said feed table is at rest whereby riders, pin tickets and transfers are automatically applied to the work.

3. A combined labeling and marking apparatus comprising an annular feed table, a drive motor, a cam shaft connected to said motor, a plurality of cams on said cam shaft, a plurality of switches operated by said cams, a one revolution clutch connected to said motor, drive means connecting said clutch and said table whereby upon operation of said clutch said table will be rotated a predetermined distance, work holding means on said table comprising vertically movable plungers disposed adjacent the inner edge of said table, an arm on each plunger for clamping work therebetween and the upper surface of said table, resilient means for biasing said arms toward clamping position, fixed cam means engageable with said plungers upon rotation of said table for moving said arms to release said work, a rider applying apparatus disposed within said feed table and having a work table extending over said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a first transfer printing apparatus disposed over said feed table for successively applying transfers to work clamped on said feed table, a second transfer printing apparatus disposed over said feed table for successively applying transfers to work clamped on said feed table, means for adjustably positioning each transfer apparatus to locate said transfers in any desired position on the work and electrical connections between said pin ticket machine and each transfer apparatus and others of said cam operated switches to initiate operation thereof while said feed table is at rest whereby riders, pin tickets and transfers are automatically applied to the work.

4. A combined labeling and marking apparatus comprising an annular feed table, a drive motor, a cam shaft connected to said motor, a plurality of cams on said cam shaft, a plurality of switches operated by said cams, a one revolution clutch connected to said motor, drive means connecting said clutch and said table whereby upon operation of said clutch said table will be rotated a predetermined distance, work holding means on said table comprising vertically movable plungers disposed adjacent the inner edge of said table, an arm on each plunger for clamping work therebetween and the upper surface of said table, resilient means for biasing said arms toward clamping position, fixed cam means engageable with said plungers upon rotation of said table for moving said arms to release said work, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfer in any desired position on the work and electrical connections between said pin ticket machine and said transfer apparatus and others of said cam operated switches to initiate operation thereof while said feed table is at rest whereby riders, pin tickets and transfers are automatically applied to the work.

5. A combined labeling and marking apparatus comprising an annular feed table, a drive motor, a cam shaft connected to said motor, a plurality of cams on said cam shaft, a plurality of switches operated by said cams, drive means connecting said motor and said table and including means for intermittently rotating said table a predetermined distance, work holding means on said table comprising vertically movable plungers disposed adjacent the inner edge of said table, an arm on each plunger for clamping work therebetween and the upper surface of said table, resilient means for biasing said arms toward clamping position, fixed cam means engageable with said plungers upon rotation of said table for moving said arms to release said work, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfers in any desired position on the work and electrical connections between said pin ticket machine and said transfer apparatus and others of said cam operated switches to initiate operation thereof while said feed table is at rest whereby riders, pin tickets and transfers are automatically applied to the work.

6. A combined labeling and marking apparatus comprising an annular feed table, a drive motor, a cam shaft connected to said motor, a plurality of cams on said cam shaft, a plurality of switches operated by said cams, drive means connecting said motor and said table and including means for intermittently rotating said table a predetermined distance, work holding means on said table comprising vertically movable plungers disposed adjacent the inner edge of said table, an arm on each plunger for clamping work therebetween and the upper surface of said table, resilient means for biasing said arms toward clamping position, means operable upon rotation of said table for moving said arms to release said work, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfer in any desired position on the work and electrical connections between said pin ticket machine and said transfer apparatus and others of said cam operated switches to initiate operation thereof while said feed table is at rest whereby riders, pin tickets and transfers are automatically applied to the work.

7. A combined labeling and marking apparatus comprising an annular feed table, a drive motor, a cam shaft connected to said motor, a plurality of cams on said cam shaft, a plurality of switches operated by said cams, drive means connecting said motor and said table and including means for intermittently rotating said table a predetermined distance, work holding means on said table disposed adjacent the inner edge thereof, resilient means for biasing said work holding means into clamping position, means operable upon rotation of said table for moving said work holding means to release said work, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfer in any desired position on the work and electrical connections between said pin ticket machine and said transfer apparatus and others of said cam operated switches to initiate operation thereof while said feed table is at rest whereby riders, pin tickets and transfers are automatically applied to the work.

8. A combined labeling and marking apparatus comprising an annular feed table, a drive motor, a cam shaft connected to said motor, a plurality of cams on said cam shaft, a plurality of switches operated by said cams, drive means connecting said motor and said table and including means for intermittently rotating said table a predetermined distance, work holding means on said table disposed adjacent the inner edge thereof, means operable upon rotation of said table for moving said work holding means to release said work, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfer in any desired position on the work and electrical connections between said pin ticket machine and said transfer apparatus and others of said cam operated switches to initiate operation thereof while said feed table is at rest whereby riders, pin tickets and transfers are automatically applied to the work.

9. A combined labeling and marking apparatus comprising an annular feed table, a drive motor, a cam shaft connected to said motor, a plurality of cams on said cam shaft, a plurality of switches operated by said cams, drive means connecting said motor and said table and including means for intermittently rotating said table a predetermined distance, work holding means on said table disposed adjacent the inner edge thereof, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table, means for adjustably positioning said transfer apparatus to locate said transfer in any desired position on the work and electrical connections between said pin ticket machine and said transfer apparatus and others of said cam operated switches to initiate operation thereof while said feed table is at rest whereby riders, pin tickets and transfers are automatically applied to the work.

10. A combined labeling and marking apparatus comprising an annular feed table, a drive motor, a cam shaft connected to said motor, a plurality of cams on said cam shaft, a plurality of switches operated by said cams, drive means connecting said motor and said table, and including means for intermittently rotating said table a predetermined distance, work holding means on said table disposed adjacent the inner edge thereof, a rider applying machine disposed within said feed table, an electrical connection between said rider applying machine and one of said cam operated switches to initiate operation of said rider applying machine during rotation of said feed table, a pin ticket applying machine disposed within said feed table adjacent the inner edge thereof whereby work clamped on said feed table may be conveyed to said pin ticket machine and removed therefrom, ejecting means on said pin ticket machine for ejecting work therefrom after application of a pin ticket, a transfer printing apparatus disposed over said feed table for successively applying transfers to work clamped on said feed table and electrical connections between said pin ticket machine and said transfer apparatus and others of said cam operated switches to initiate operation thereof while said feed table is at rest whereby riders, pin tickets and transfers are automatically applied to the work.

11. A combined labeling and marking apparatus comprising an annular feed table, a drive motor, control means connected to said motor, drive means connecting said motor and said table and including means for intermittently rotating said table a predetermined distance, work holding means on said table disposed adjacent the inner edge thereof, a rider applying machine disposed within said table, a connection between said rider applying machine and said control means to initiate operation of said rider applying machine, a pin ticket applying machine disposed within said table adjacent the inner edge thereof whereby work clamped on said table may be conveyed to said pin ticket machine and removed therefrom, ejecting means on said pin ticket machine for ejecting work therefrom after application of a pin ticket, a transfer printing apparatus disposed over said table for successively applying transfers to work clamped on said table, and electrical connections between said pin ticket machine and said transfer apparatus and said control means to initiate operation thereof whereby riders, pin tickets and transfers are automatically applied to the work.

12. A combined labeling and marking apparatus comprising an annular feed table, a drive motor, drive means connecting said motor and said table and including means for intermittently rotating said table a predetermined distance, work holding means on said table disposed adjacent the inner edge thereof, a rider applying machine disposed within said table, a pin ticket machine disposed within said table adjacent the inner edge thereof, a pin applying machine disposed within said table adjacent the inner edge thereof whereby work clamped on said table may be conveyed to said pin ticket machine and removed therefrom, ejecting means on said pin ticket machine for ejecting work therefrom after application of a pin ticket, a transfer printing apparatus disposed over said table for successively applying transfers to work clamped on said table and control means for initiating operation of said rider applying machine, said pin ticket machine and said transfer apparatus in timed relation to the movement of said table whereby riders, pin tickets and transfers are automatically applied to the work.

13. A combined labeling and marking apparatus as defined in claim 6 in which said rider applying machine comprises apparatus for applying riders having a thermoplastic coating to articles comprising a base, a drive motor mounted on said base, a cam shaft rotatably supported on said base, a clutch connecting said cam shaft and said motor, a trackway disposed above said base, riders in the form of a roll of tape supported adjacent said trackway, means on said trackway for slidably receiving said tape, feeding means for said tape comprising a crosshead slidably mounted on said trackway for reciprocating movement longitudinally thereof, a fixed clamping jaw carried by said crosshead beneath said tape, a movable clamping jaw pivotally mounted on said crosshead above said tape and cooperating with said fixed jaw to clamp said tape therebetween, drive means including a cam on said cam shaft for reciprocating said crosshead, means for engaging and disengaging said clamping jaws comprising a dog pivotally connected to said movable jaw, a trip plate mounted on said trackway in the path of movement of said dog whereby upon movement of said jaws in one direction said dog will slide over said trip plate and upon movement in the opposite direction said dog will engage said trip plate to move said jaws into clamping engagement with said tape and advance the same in said trackway, an arm connected to said movable jaw, a cam mounted on said trackway in the path of movement of said arm whereby upon engagement of said arm with said cam said movable jaw will be moved away from said fixed jaw to release said tape, a knife blade disposed adjacent the exit end of said trackway, means including a cam on said cam shaft for operating said blade to sever individual riders from said tape, a fixed heated iron mounted on said base, a movable heated iron carried by an arm pivotally mounted on said base and a cam on said cam shaft for controlling the movement of said movable iron, a work table reciprocably mounted on said base for movement toward and away from said fixed iron, a notch in the leading edge of said table in alignment with said fixed iron, means including a cam on said cam shaft to reciprocate said table and means adjacent the exit end of said trackway for positionng a rider in front of articles disposed on said table whereby upon forward movement of said table said rider will be folded about the edges of said articles and said iron will engage said riders and activate said thermoplastic coating to secure said rider to said article.

14. A combined labeling and marking apparatus as defined in claim 6 in which said rider applying machine comprises apparatus for applying riders having a thermoplastic coating to articles comprising a base, a trackway disposed above said base, means on said trackway for slidably receiving riders in the form of a tape, feeding means for said tape, drive means for said feeding means, means disposed adjacent the exit end of said trackway to sever individual riders from said tape, a pair of cooperating heated irons movable toward and away from each other and means for controlling the movement of said irons, a work table mounted on said base for movement toward and away from said irons, means to move said table and means adjacent the exit end of said trackway for positioning a rider in front of articles disposed on said table whereby upon forward movement of said table said rider will be folded about the edges of said articles and said irons will engage said rider and activate said thermoplastic coating to secure said rider to said articles.

15. A combined labeling and marking apparatus as defined in claim 6, in which said pin ticket applying machine includes a movable work support for moving work into ticket applying position, means for feeding tickets into ticket applying position, means for feeding pins into pin driving position, means for driving said pins through said tickets and said work to attach said tickets to said work and work ejecting means comprising a slidable ejecting bar, a beveled end on said bar engageable with a ticket attached to said work, a compression spring biasing said bar to inoperative position, a bell crank lever having one end engaging said bar and a cam surface on the opposite end of said lever located in the path of movement of a portion of said ticket feeding means whereby upon operation of said ticket feeding means said lever will operate to move said bar and eject the work from ticket applying position.

16. A combined labeling and marking apparatus as defined in claim 6 in which said pin ticket applying machine includes a movable work support for moving work into ticket applying position, means for feeding tickets into ticket applying position, means for feeding pins into pin driving position, means for driving said pins through said tickets and said work to attach said tickets to said work and work ejecting means comprising a slidable ejecting bar, a beveled end on said bar engageable with a ticket attached to said work, resilient means biasing said bar to inoperative position, a bell crank lever for actuating said bar and a cam surface on said lever located in the path of movement of a portion of said ticket feeding means whereby upon operation of said ticket feeding means said lever will operate to move said bar and eject the work from ticket applying position.

17. A combined labeling and marking apparatus as defined in claim 6 in which said pin ticket applying machine includes a movable work support for moving work into ticket applying position, means for feeding tickets into ticket applying position, means for feeding pins into pin driving position, means for driving said pins through said tickets and said work to attach said tickets to said work and work ejecting means comprising a slidable ejecting bar engageable with a ticket attached to said work, means operable by said ticket feeding means for actuating said bar whereby upon operation of said ticket feeding means said bar will operate to eject the work from ticket applying position.

18. A combined labeling and marking apparatus as defined in claim 6 in which said transfer printing apparatus comprises a heated iron mounted for movement toward and from said feed table, a frame, a roll of tape rotatably mounted on said frame, spaced transfers of heat sensitive ink carried by said tape, an elongated base member carried by said frame, a roller adjustably mounted on said base member adjacent one end thereof, a micro-switch mounted on the opposite end thereof, a rocker arm pivotally mounted on said base member, a roller mounted on said rocker arm adjacent said first mentioned roller, adjustable resilient means engaging said base and said rocker arm to bias said rollers into engagement, and adjustable push rod mounted on said rocker arm and engageable with said micro-switch to open and close the same upon pivotal movement of said rocker arm, guide means for directing said tape from said roll between said rollers and for positioning said tape above said table in spaced substantially parallel relation thereto, tape pulling means comprising a bracket, a friction roller mounted on said bracket, an idler roller mounted on said bracket for holding said tape in engagement with said friction roller, a driving motor, a clutch between said motor and said friction roller and means for engaging and disengaging said clutch, a limit switch, means to open and close said limit switch by movement of said iron, whereby upon movement of said iron downwardly into engagement with said tape to apply said transfer to an article on said feed table and upon return movement of said iron to uppermost position the closing of said limit switch which will serve to engage said clutch thereby advancing said tape to bring the next transfer into registry with said iron, such registration being effected by the engagement of a transfer with said rollers, the thickness of the ink forming the transfer moving said rollers apart to pivot said rocker arm and close said micro-switch to disengage said clutch.

19. A combined labeling and marking apparatus as defined in claim 6 in which said transfer printing apparatus comprises a fluid pressure cylinder disposed above said feed table, a piston in said cylinder, a heated iron carried by said piston for movement therewith, a frame, a roll of tape rotatably mounted on said frame, spaced transfers of heat sensitive ink carried by said tape, a base member, a roller mounted on said base member, a micro-switch mounted on said base member, a pivotally mounted rocker arm, a roller mounted on said rocker arm adjacent said first mentioned roller, means to bias said rollers into engagement, means on said rocker arm engageable with said micro-switch upon pivotal movement of said rocker arm, guide means for directing said tape from said roll between said rollers and for positioning said tape above said feed table in spaced substantially parallel relation thereto, tape pulling means comprising a friction roller, means for holding said tape in engagement with said friction roller, a driving motor, a clutch between said motor and said friction roller and fluid pressure means for engaging and disengaging said clutch, a source of fluid pressure, means for controlling the flow of fluid from said source to said fluid pressure cylinder and to said fluid pressure means, a limit switch, means to open and close said limit switch upon movement of said iron whereby upon operation of said control means to cause the flow of fluid to said fluid pressure cylinder said iron will move downwardly into engagement with said tape to apply said transfer to said article and upon return of said iron to uppermost position the closing of said limit switch will cause the flow of fluid to said fluid pressure means to engage said clutch, thereby advancing said tape to bring the next transfer into registry with said iron, such registration being effected by the engagement of the transfer with said rollers, the thickness of the ink forming the transfer moving said rollers apart to pivot said rocker arm and close said micro-switch to cause said fluid pressure means to disengage said clutch.

20. A combined labeling and marking apparatus as defined in claim 6 in which said transfer printing apparatus comprises a heated iron mounted for movement toward and from said feed table, a frame, a roll of tape rotatably mounted on said frame, spaced transfers of heat sensitive ink carried by said tape, a base member, a roller mounted on said base member, a micro-switch mounted on said base member, a pivotally mounted rocker arm, a roller mounted on said rocker arm adjacent said first mentioned roller, means to bias said rollers into engagement, means on said rocker arm engageable with said micro-switch to open and close the same upon pivotal movement of said rocker arm, guide means for directing said tape from said roll between said rollers and for positioning said tape above said feed table in spaced substantially parallel relation thereto, tape pulling means comprising a friction roller, means for holding said tape in engagement with said friction roller, a driving motor, a clutch between said motor and said friction roller and means for engaging and disengaging said clutch, a limit switch, means to open and close said limit switch upon movement of said iron whereby upon movement of said iron downwardly into engagement with said tape to apply said transfer to an article on said feed table and upon return movement of said iron to uppermost position closing of said limit switch serves to engage said clutch thereby advancing said tape to bring the next transfer into registry with said iron, such registration being effected by the engagement of a transfer with said rollers, the thickness of the ink forming a transfer moving said rollers apart to pivot said rocker arm and close said micro-switch thus disengaging said clutch.

References Cited in the file of this patent

UNITED STATES PATENTS

| Number | Name | Date |
| --- | --- | --- |
| 967,914 | Herrick et al. | Aug. 23, 1910 |
| 1,351,107 | Kwasis | Aug. 31, 1920 |
| 1,833,417 | Drake | Nov. 24, 1931 |
| 1,954,287 | Flood | Apr. 10, 1934 |
| 2,078,448 | Jost | Apr. 27, 1937 |
| 2,083,150 | Flood | June 8, 1937 |
| 2,271,848 | Tcimpidis | Feb. 3, 1942 |
| 2,286,458 | Bowman et al. | June 16, 1942 |
| 2,323,843 | Richter et al. | July 6, 1943 |
| 2,327,068 | Rylander | Aug. 17, 1943 |
| 2,447,072 | Jones | Aug. 17, 1948 |